(12) United States Patent
Ishigaki et al.

(10) Patent No.: US 6,461,507 B1
(45) Date of Patent: Oct. 8, 2002

(54) CONTINUOUS SQUEEZE-DEWATERING DEVICE

(75) Inventors: Eiichi Ishigaki; Tooru Mori; Kunio Fujita; Masayoshi Katayama; Masafumi Nasu, all of Kagawa (JP)

(73) Assignee: Ishigaki Company Limited, Tokyo (JP)

( * ) Notice: Subject to any disclaimer, the term of this patent is extended or adjusted under 35 U.S.C. 154(b) by 0 days.

(21) Appl. No.: 09/530,789

(22) PCT Filed: Sep. 17, 1999

(86) PCT No.: PCT/JP99/05077

§ 371 (c)(1),
(2), (4) Date: May 2, 2000

(87) PCT Pub. No.: WO00/16970

PCT Pub. Date: Mar. 30, 2000

(30) Foreign Application Priority Data

Sep. 17, 1998 (JP) .......................... 10-263014
Oct. 19, 1998 (JP) .......................... 10-296477

(51) Int. Cl.[7] .......................... B01D 25/02; B01D 25/38
(52) U.S. Cl. ............... 210/333.01; 201/111; 201/117; 201/225; 201/231; 201/313; 201/314; 201/334; 201/346; 201/413; 201/411; 366/309; 366/330.7; 416/237; 416/241 R
(58) Field of Search ............... 210/413–415, 210/314, 407, 408, 333.01, 332, 346, 321.63, 111, 225, 411–412, 483, 486, 488–489, 495–117, 313, 339, 331, 327, 334, 231; 366/309, 330.7; 416/223 R, 241 R, 241 A, 237

(56) References Cited

U.S. PATENT DOCUMENTS 201,650 A * 3/1878 Capern 1,042,803 A * 10/1912 Krassa (List continued on next page.)

FOREIGN PATENT DOCUMENTS

| JP | 5-59681 | 3/1993 |
|---|---|---|
| JP | 06-000625 | 1/1994 |
| JP | 6-292997 | 10/1994 |
| JP | 9-271612 | 10/1997 |
| JP | 3055123 | * 10/1998 |
| JP | 44-2929 | 2/1999 |
| WO | WO 97/26973 | 7/1997 |
| WO | WO 98/24532 | 6/1998 |

OTHER PUBLICATIONS

European Search Report.

*Primary Examiner*—Matthew O. Savage
*Assistant Examiner*—Marianne Ocampo
(74) *Attorney, Agent, or Firm*—McDonnell Boehnen Hulbert & Berghoff

(57) ABSTRACT

A continuous compression-type dewatering apparatus has a filter chamber (3), a drive shaft (17), a vane (15), and a supply path (50). The filter chamber (3) is delineated by an annular plate (2) and two side plates (1, 1). The drive shaft (17) passes through the center axis of the annular plate (2) and through the inside of the filter chamber (3), and is free to rotate with respect to the filter chamber (3). The vane (15) is disposed within the filter chamber (3), is fixed with respect to the drive shaft (17), and rotates in concert with the drive shaft (17). The supply path (50) passes through the drive shaft (17) and supplies raw fluid to the filter chamber (3). The vane (15) as two side edges (15a, 15a) facing the side plates (1, 1) and an end edge (15b) facing the annular plate (2). The side plates (1, 1) include a screen (4) for separating the raw fluid into a filtered fluid and a cake. The annular plate (2) includes an ejection port (7) for the cake. Inflow pressure of the raw fluid from the supply path (50) into the filter chamber (3) and rotation of the vane (15) causes the filtered fluid to flow out from the filter element (4) to the outside of the filter chamber (3), a cake that remains inside the filter chamber (3) being pushed to the outside of the filter chamber (3) via the ejection port (7).

42 Claims, 14 Drawing Sheets

U.S. PATENT DOCUMENTS 2,967,014 A * 1/1961 Pabst
3,163,601 A * 12/1964 Ericson et al.
3,455,821 A * 7/1969 Arema
3,471,026 A * 10/1969 Riker
4,036,759 A * 7/1977 Donovan .................... 210/298
4,721,394 A * 1/1988 Casto et al.
4,722,789 A * 2/1988 Kupka ........................ 210/225
4,781,828 A * 11/1988 Kupka ........................ 210/225
5,643,450 A    7/1997 Bacher et al.
6,106,235 A * 8/2000 Tettenborn et al.
6,171,448 B1 * 1/2001 Iwashige
6,227,390 B1 * 5/2001 Bacher et al.

* cited by examiner 4
4a 4b
5a
5b
5
6
17
19
18
15
16

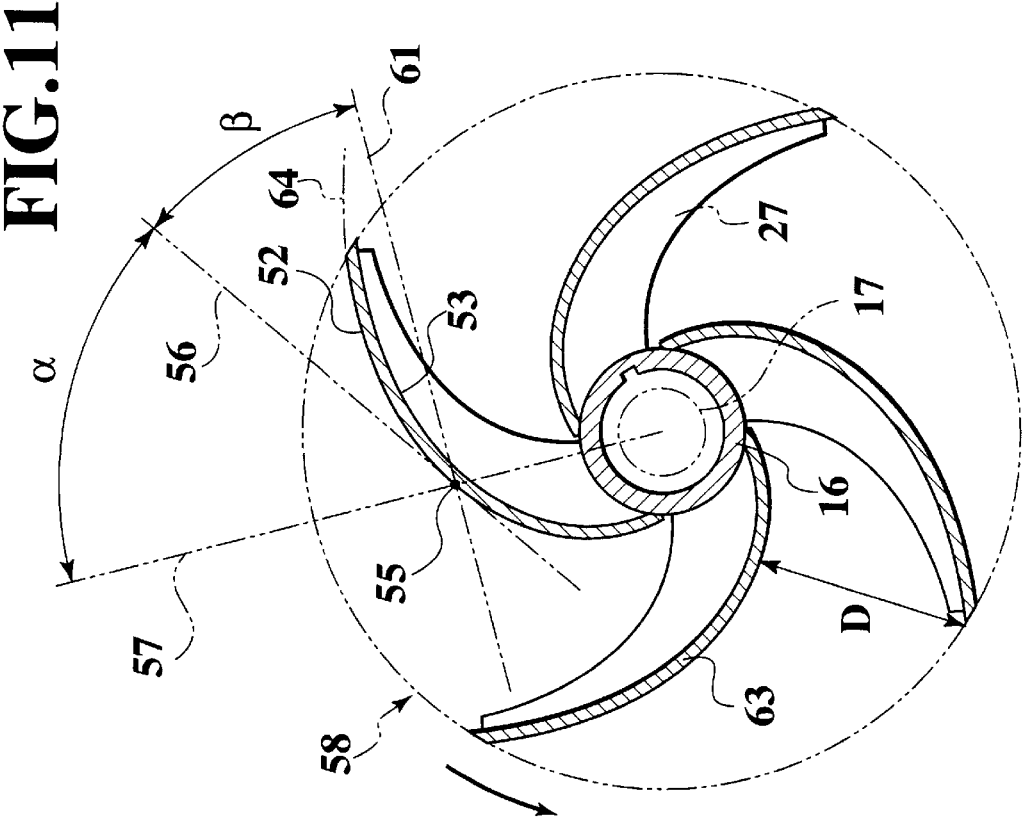
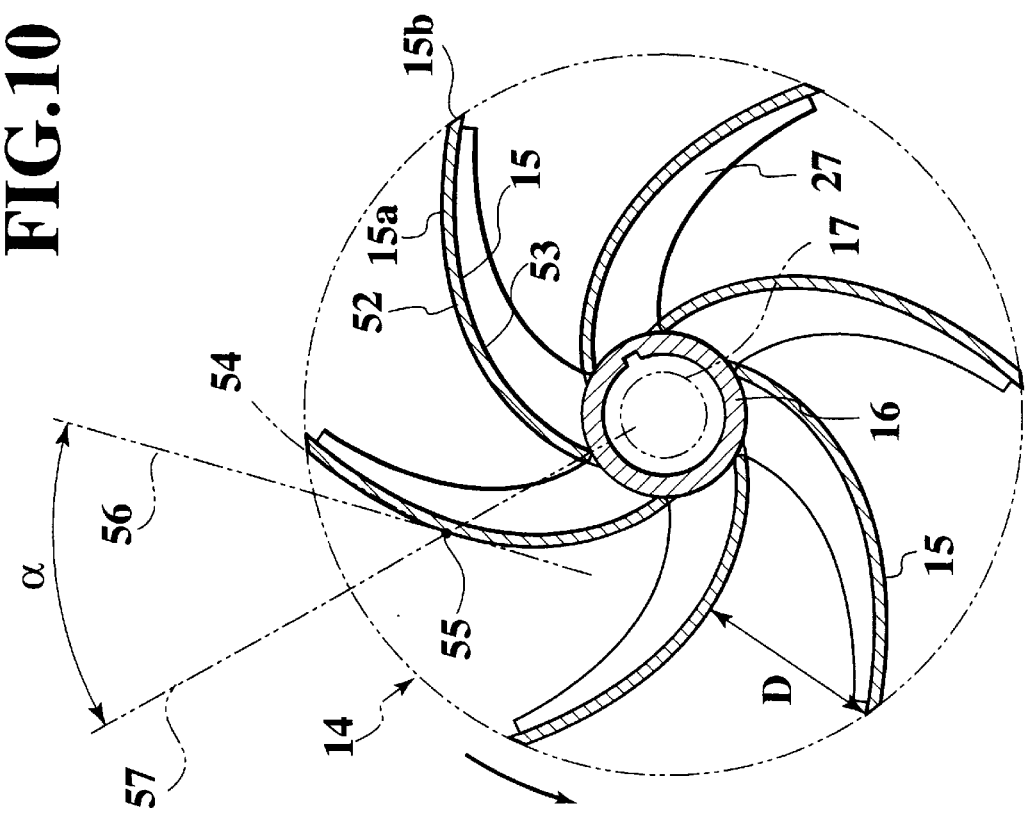

CONTINUOUS SQUEEZE-DEWATERING DEVICE

This application is a 371 of PCT/JP99/05077 filed on Sep. 17, 1999 which has been published as WO00/16970 on Mar. 30, 2000, and claims the priority benefits of Japanese applications, P10-263014 filed on Sep. 17, 1998 and P10-296477 filed on Oct. 19, 1998.

TECHNICAL FIELD

The present invention relates to a continuous compression-type dewatering apparatus for concentrated sludge, and more particularly to a compression-type dewatering apparatus for sludge that is difficult to filter, such as sewage sludge.

BACKGROUND ART

A filter press, a belt press, and a screw press (refer to Japanese Patent Application Publication No. 44-2929 and Japanese Unexamined Patent Application Publication No. 6-695, for example) are known types of pressurized dewatering apparatuses for dewatering difficult-to-filter sludge, such as sewage sludge.

With a filter press, however, there is a tendency for clogging to occur in the filter cloth used as a filter material, and it is difficult to renew the filter cloth by cleaning.

With a belt press, in order to sustain the functions of the filter cloth used as a filter material, it is necessary to continuously clean the filter cloth as dewatering is performed. For this reason, a large amount of cleaning water is consumed. Additionally, because sludge is only pressurized at the outer peripheral surfaces of a large number of pressure rolls arrange in a line, a large amount of installation space is required, and the filtering efficiency is low.

With a screw press, because the filtering surface is divided on the inner surface of a cylindrical metal filter material, a large amount of installation space is required, and the filtering efficiency is low.

DISCLOSURE OF THE INVENTION

In consideration of the above-described problems occurring in the past, it is an object of the present invention to provide a continuous compression-type denaturing apparatus having simple construction, small size, and a small installation space, and which has a high filtering efficiency, and operates at a low speed, so as to require only a small drive source.

To achieve the above-noted object, a first aspect of the present invention has a filter chamber (3), a drive shaft (17), vanes (15), and a supply path (50). The filter chamber (3) is divided into an annular plate (2) and two side plates (1, 1). The drive shaft (17) passes through the center axis of the annular plate (2) and through the inside of the filter chamber (3), and is freely rotatable with respect to the filter chamber (3). The vanes (15) are disposed within the filter chamber (3), are fixed with respect to the drive shaft (17), extend from the drive shaft (17) toward the annular plate (2), and rotate in concert with the drive shaft (17). The supply path (50) passes through the inside of the drive shaft (17) and supplies raw fluid to the filter chamber (3). The vanes (15) have two side edges (15a, 15a) that face the side plates (1, 1) and an end edge (15b) that faces the annular plate (2).

At least one of the side plates (1, 1) includes a filter element (4) for separating the raw fluid into a liquid and a cake. The annular plate (2) includes an ejection port (7) for the cake.

By the action of the inflow pressure of the raw fluid from the supply path (18) to within the filter chamber (3) and the rotation of the vane (15), the filtered fluid flows out from the filter element (4) to the outside of the filter chamber (3), a cake that remains inside the filter chamber (3) being pushed to the outside of the filter chamber (3) from the ejection port (7).

In the above-noted configuration, the raw fluid flows into the center part of the filter chamber (3) from the supply path (50). After having flowed into the filter chamber (3) the raw fluid receives the flow pressure thereof and moves toward the side plate (1), and is filtered by the filter element (4). The filtered fluid passes through the filter element (4) and is ejected from the filter chamber (3), the cake remaining on the filter element (4). The remaining thin film of cake is scraped by side edge (15b) of the rotating vanes (15), and is sent toward the outer periphery by the vanes (15). When the cake moves, a rotational friction force develops between the cake and the vanes (15), so that sliding resistance is generated between the cake and the side plate (1). For this reason, the cake is further filtered as it moves, so that the water content is lowest in the region of the annular plate (2). The cake with low water content is ejected via the ejection port (7).

The filter element (4) can be provided on each of the side plates (1), and can be provided over substantially the entire area of the side plate (1). By doing this, the filtering surface area with respect to the raw fluid is increased, thereby further increasing the filtering efficiency.

The annular plate (2) can include a second filter element (9) for separating the raw fluid into a liquid and a cake. By doing this, the filtering surface area with respect to the raw fluid is increased, thereby further increasing the filtering efficiency. The cake on the filter element (9) is pressured by the end edge (15b) of the vane (15) and further dewatered, so that a cake with a further decreased water content is ejected from the ejection port (7).

The filter element (4) can be a substantially donut-shaped screen (4) with a large number of fine holes. The second filter element (9) can be a screen (9) with a large number of fine holes.

The side plate (1) can have a screen (4), an annular outer frame (5) fixed to the outer peripheral edge of the screen (4), an annular inner frame (6) fixed to the inner peripheral edge of the screen (4), and a rib (5a) that links the outer frame (5) and the inner frame (6). By doing this, mounting of the screen (4) to the side plate (1) is facilitated, and the strength of the screen (4) is increased.

The supply path (50) can have a main supply path (18) within the drive shaft (17), a supply port (19) formed in the drive shaft (17) that opens toward the main supply path (18), and a linking path (11) adjacent to the drive shaft (17) on the side of the vane (15) and linking the supply port (19) and the filter chamber (3).

In the above-noted configuration, the raw fluid flows from the main supply path (18) through the supply port (19) and the linking path (11) into the filter chamber (3) from the side of the vane (15). The position of the supply port (19) is not particularly restricted, as long as it is on the side of the vane (15). In contrast, in the case in which the raw fluid is directly supplied from the main supply path (18) into the filter chamber (3), it is necessary that a port for supplying be formed in the part of the drive shaft (17) facing the filter chamber (3). Therefore, in order that the vane (15) be securely fixed by the drive shaft (17), there is the possibility of an increase in the material thickness of the drive shaft (17). When the material thickness of the drive shaft (17) increases, this can bring with it an increase in the weight and size of the apparatus.

With regard to this point, according to the above-noted configuration it is possible to form the supply port (19) at a location that does not present a problem with regard to strength, thereby limiting the increase in weight and size of the apparatus.

The vanes (15, 63, 65, 67) can have operative surfaces that are forward in the rotational direction of the drive shaft (17), and the linear shape of the operative surface on a cross-section perpendicular to the drive shaft (17) can be substantially the same, and not dependent upon the location on the cross-section in the axial direction of the drive shaft (17).

The operative surface (52) on the cross-section perpendicular to the drive shaft (17) can be represented by a line along a reference straight line (68) passing through the center of the drive shaft (17).

The operative surface (52) on the cross-section perpendicular to the drive shaft (17) can be represented as a line along reference curved lines (54, 64) extending from the drive shaft (17), and a tangent line (56) at an arbitrary point on the reference curved lines (54, 64) can be inclined towards the rear of the rotational direction of the drive shaft (17) with respect to a straight line (57) passing through the arbitrary point and the center of the drive shaft (17).

The vanes (15, 63) in the above-noted configuration have a function of sending the cake in a radial direction, and a function of generating a filtering force with respect to the cake. The filtering force with respect to the cake is obtained as a force of repulsion with respect to a sliding resistance between the vanes (15, 63) and the side plate (1).

The reference curved line (64) can be can be a logarithmic spiral having an intersecting angle ($\alpha$) with the tangent line (56) and the straight line (57) that is constant and not dependent upon the position of the arbitrary point.

Because the intersection angle ($\alpha$) is constant, the vane (63) in the above-noted configuration, in proximity to the annular plate (12), where the water content of the cake is reduced, there is an increase in the rotating wedge operating force and the force which moves the cake in a radial direction along a curved line, so that a large shear force is applied to the cake.

The operative surface (52) in the cross-section can be represented by a piecewise linear curve (62) formed by a plurality of straight line segments.

In the above-noted configuration, the vane (67) is easy to manufacture and provides sufficient strength.

The vanes (15, 63, 65, 67) can have a rear surface (53) to the rear in the rotation direction of the drive shaft (17) and a rib (27) which protrudes from the rear surface (53) and reinforces the vane (15).

According to the above-noted configuration, the strength of the vanes (15, 63, 65, 67) is increased. For this reason, a rotating wedge action is achieved with respect to the cake, which has a reduced water content and increased sliding resistance.

A scraper (26) in proximity to the side plate (1) can be provided on at least one side edge (15a) of the vane (15).

According to the above-noted configuration, the thin film cake on the filter element (4) with high filter resistance is scraped off, thereby successively renewing the filter elements (4). It is therefore possible to perform continuous filtering operation over a long period of time.

A resin coating can be applied to the operative surface (52).

According to the above-noted configuration, the sliding resistance of the cake with respect to the operative surface (52) when the cake is compressed during rotation is reduced. Therefore, in addition to an increase in the operating efficiency of the apparatus, it becomes difficult for the cake to rotate in concert with the vane (15).

The above-noted apparatus according to the first aspect can be provided with valve mechanisms (8, 8a) that increase and decrease the amount of opening of the ejection port (7).

According to the above-noted configuration, the amount of opening of the ejection port (7) is adjusted by the valve mechanisms (8, 8a), so that the cake is subject to back pressure, dewatered under compression, and ejected from the ejection port (7).

The valve mechanism (8) can have a pair of rotating shafts (28, 28) rotatably supported with respect to the opposing edge of the ejection port (7), a pair of dampers (29, 29) fixed to each of the rotating shafts (28) which open and close the ejection port (7), a cylinder (32) having a rod (33), and two links (30, 30) that link the rod (33) and the rotating shafts (28, 28), convert the reciprocating motion of the rod (33) to rotational motion of the rotating shafts (28, 28) and transmit this motion.

In the above-noted configuration, the amount of opening of the ejection port is adjusted by a valve (8) having a simple construction. As a result, back pressure is received, and compression dewatering is done, so that a cake having substantially uniform water content is ejected from the center of the ejection port (7).

The valve mechanism (8a) can have a rotating shaft (28a) rotatably supported with respect to the ejection port (7), a damper (29a) fixed to the rotating, shaft (28a) that opens and closes he ejection port (7), a cylinder (32) having a rod (33), and a lever (43) that links the rod (33) and the rotating shaft (28a), converts reciprocating motion of the rod (33) to rotational motion of the rotating shaft (28a), and transmits this motion.

In the above-noted configuration, the amount opening of the ejection port (7) is adjusted by the valve mechanism (8a) vz having a simple construction. As a result, back pressure is received, and compression dewatering is done, so that a cake having substantially uniform water content is ejected from the ejection port (7).

An apparatus according to the above-noted first aspect, a cleaning nozzle (34) can further be provided for the filter element (4). The cleaning nozzle (34) can be disposed in opposition to the filter element (4) on the outside of the side plate (1).

According to the above-noted configuration, when operation of the apparatus is ended, cake remaining on the filter element (4) is removed well by cleaning water discharged from the cleaning nozzle (34).

A plurality of the vane (15) in the above-noted first aspect can be provided. By doing this, even for a raw fluid that is difficult to filter, there is an increase in the shear force and the transporting force acting one the cake, so that the cakes are pressurized and transported with good balance, thereby achieving cakes having a low water content.

The side plates (1, 1) can be disposed so as to be substantially mutual parallel, with the distance (D) from an end edge (15b) of one vane (15) to an adjacent vane (15) to the rear thereof with respect to the direction of rotation established as being greater than the length (L) between the side plates (1, 1). By doing this, the filter surface area that tries to stop the cake can be made more than twice the operative surface (52) of the vane (15) that attempts to move the cake, effectively preventing the in-concert rotation of the cake.

A continuous compression-type dewatering apparatus according to a second aspect of the present invention has a plurality of filter units (70) provided inparallel, and a drive shaft (17). Each filter unit (70) has a filter chamber (3) divided into to an annular plate (2) and two side plates (1, 1), and a vane (15) disposed within the filter chamber (3). The annular plates (2, 2) are disposed about a common axis. The drive shaft (17), passes through the center axis of the annular plates (2, 2), and through the inside of the filter chambers (3, 3), and is freely rotatably with respect to the filter chamber (3).

The vane (15) is fixed with respect to drive shaft (17), extends from the drive shaft (17) toward the annular plate (2), and rotates in concert with the drive shaft (17). A supply path (50) that supplies raw fluid to the filter chamber (3) is formed inside the drive shaft (17). The vane (15) has two side edges (15a) that face the side plates (1, 1), and an end edge (15b) that faces the annular plate (2). Of the side plates (1, 1) of the filter unit (70), at least one side plate includes a filter element (4) for the purpose of separating the raw fluid into a liquid and a cake. The annular plate (2) includes an ejection port for the cake. By the action of flow pressure of the raw fluid from the supply path (50) to within the filter chamber (3) and the rotation of the vane (15), the filtered fluid flows out form the filter element (4) to the outside of the filter chamber (3), a cake that remains inside the filter chamber (3) being pushed to the outside of the filter chamber (3) from the ejection port (7).

In the above-noted configuration, because a plurality of filter chambers (3) are provided in parallel, it is possible to perform simultaneous filtering of a large quantity of raw fluid. Additionally, the amount of space occupied by the apparatus is reduced.

BRIEF DESCRIPTION OF THE DRAWINGS

FIG. 10 is a front view of a vaned wheel.

FIG. 11 is a front view showing another aspect of a vaned wheel.

BEST NODE FOR CARRYING OUT THE INVENTION

A preferred embodiment of the present invention is described below, with reference to drawings.

Figure 1:
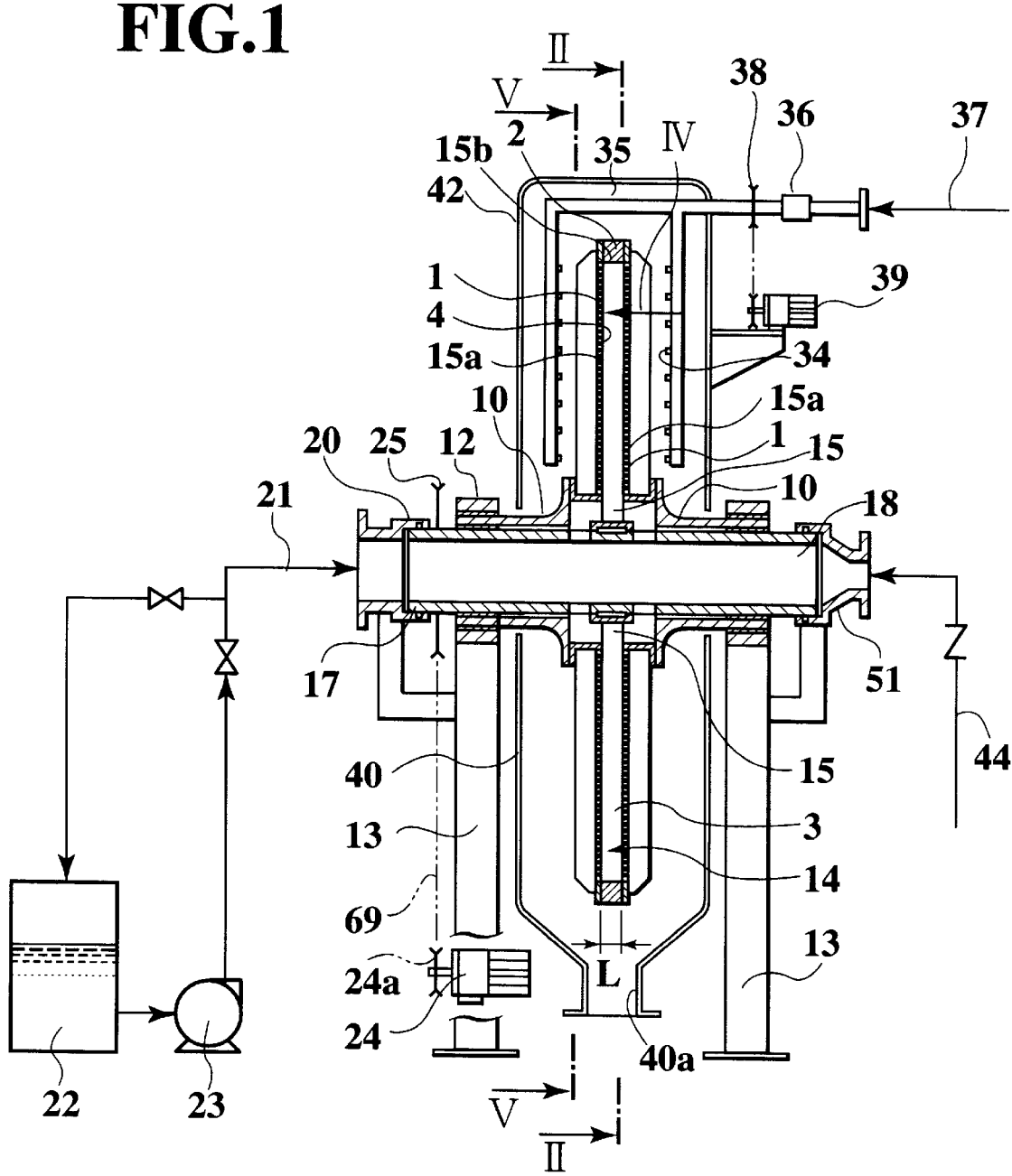
FIG. 1 is a cross-section view of a continuous compression-type dewatering apparatus according to an embodiment of the present invention.

As shown in FIG. 1, a continuous compression-type dewatering apparatus has a filter chamber 3, a drive shaft 17, a vaned wheel 14, and a supply path 50 for supplying raw fluid.

The filter chamber 3 is delineated by cylindrically shaped annular plate 2, and a pair of side plates in the form of disc-shaped filter plates (hereinafter each respectively simply called "filter plates") 1, 1 substantially in mutually parallel opposition to each other, into a cylindrical shape having a prescribed width L in the horizontal direction.

Figure 4:
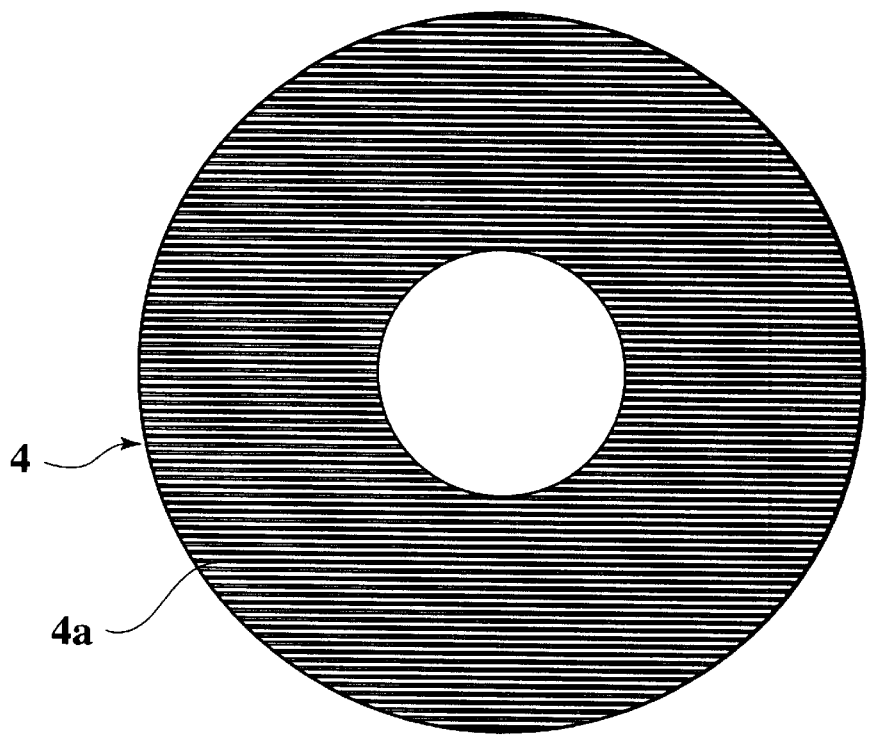
FIG. 4 is a plan view of the wedge wire screen of FIG. 1, viewed from the direction of arrow IV.
Figure 5:
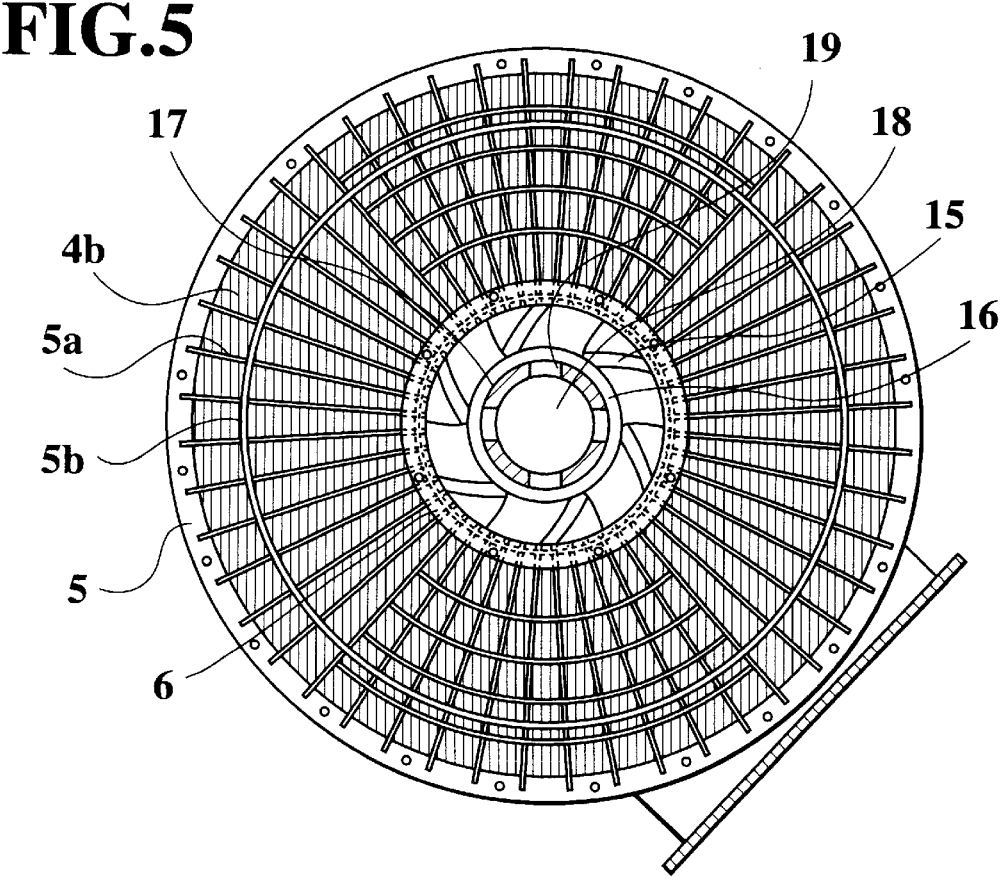
FIG. 5 is a cross-section view along the line V—V of FIG. 1.

As shown in FIG. 4 and FIG. 5, each filter plate 1, 1 is made up by a substantially donut-shaped wedge wire screen (filter element) 4, an annular outer frame 5, an annular inner frame 6, and ribs 5a, 5b. Outer peripheral edge of the filter plates 1, 1 (the outer frame 5), is joined and fixed to the both edges of the annular plate 2.

The screen 4 is made up of a plurality of wedge wires 4a aligned in a plane at a prescribed spacing, and a plurality of support rods extending in a direction substantially perpendicular to the wedge wires 4a. The support rod 4b is joined to the wedge wire 4a and supports the wedge wire 4a. The spacing between the wedge wires 4a forms fine holes. These fine holes exist in uniform density over substantially the entire area of the filter plate 1. For this reason, it is difficult for filtered liquid and solids to become clogged, thereby reducing the frequency of cleaning the filter plate 1.

The size of the minute holes of the screen 4 (the distance between adjacent wedge wires) is set to a value at which there is little passage of sludge and at which ejection of filtered fluid is good, and also at which it is difficult for sludge to become clogged. In the case of filtering sludge that is difficult to filter, the size of the fine holes is preferably made no smaller than 50 $\mu$m and no larger than 300 $\mu$m.

In place of the wedge wire screen 4, it is possible to use a metal screen formed by a punched metal, or a thin metal plate into which holes have been formed by an electron beam.

The ribs 5a extend in a radial direction of the outer frame 5 and link the outer frame 5 and the inner frame 6. The rib 5b links between ribs 5a.

The screen 4 is fitted between the outer frame 5 and the inner frame 6, and is supported by the outer frame 5, the inner frame 6, and the ribs 5a and 5b.

Figure 6:
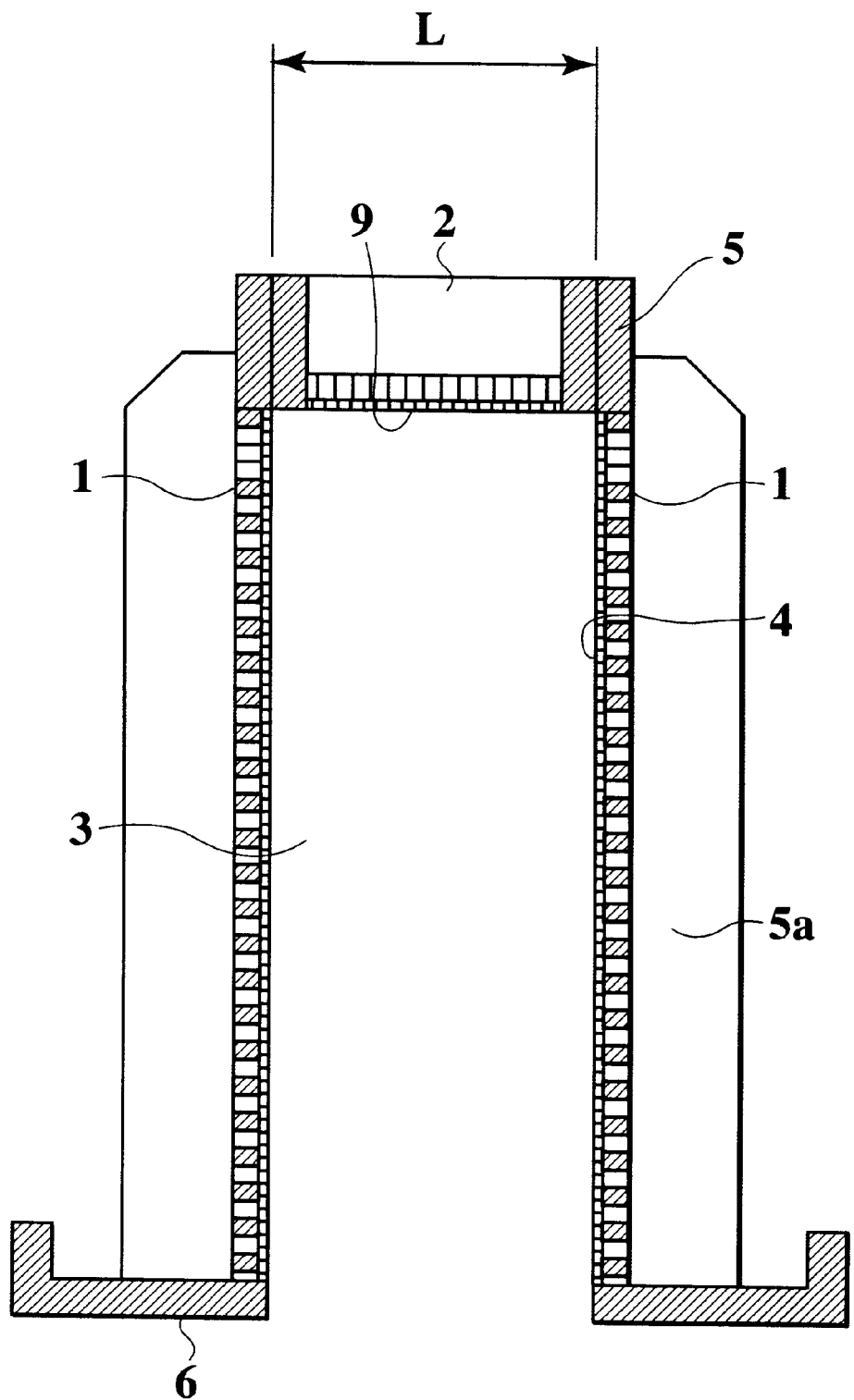
FIG. 6 is a cross-section view showing another aspect of a filter plate.

As shown in FIG. 6, at least one part of the annular plate 2 can be made of the same type of screen (filter element) 9 as the screen 4 of the filter plate 1. By doing this, the filter surface area is increased by the amount of the screen that faces the filter chamber 3.

As shown in FIG. 1, both ends of the inner frame 6, are fixed and supported by a pair of supporting tubes 10, 10 that are in mutual opposition. The supporting tubes 10 are supported on a frame 13.

The drive shaft 17 is cylindrical in shape, and passes through the center axis of the annular plate 2, and through the center of both the supporting tubes 10, 10, and through the inside of the filter chamber 3. Both ends of the drive shaft 17 are rotatably supported via the bearings 12, 12 to the supporting tubes 10, 10. That is, the drive shaft 17 can rotate freely with respect to the filter chamber 3.

Figure 2:
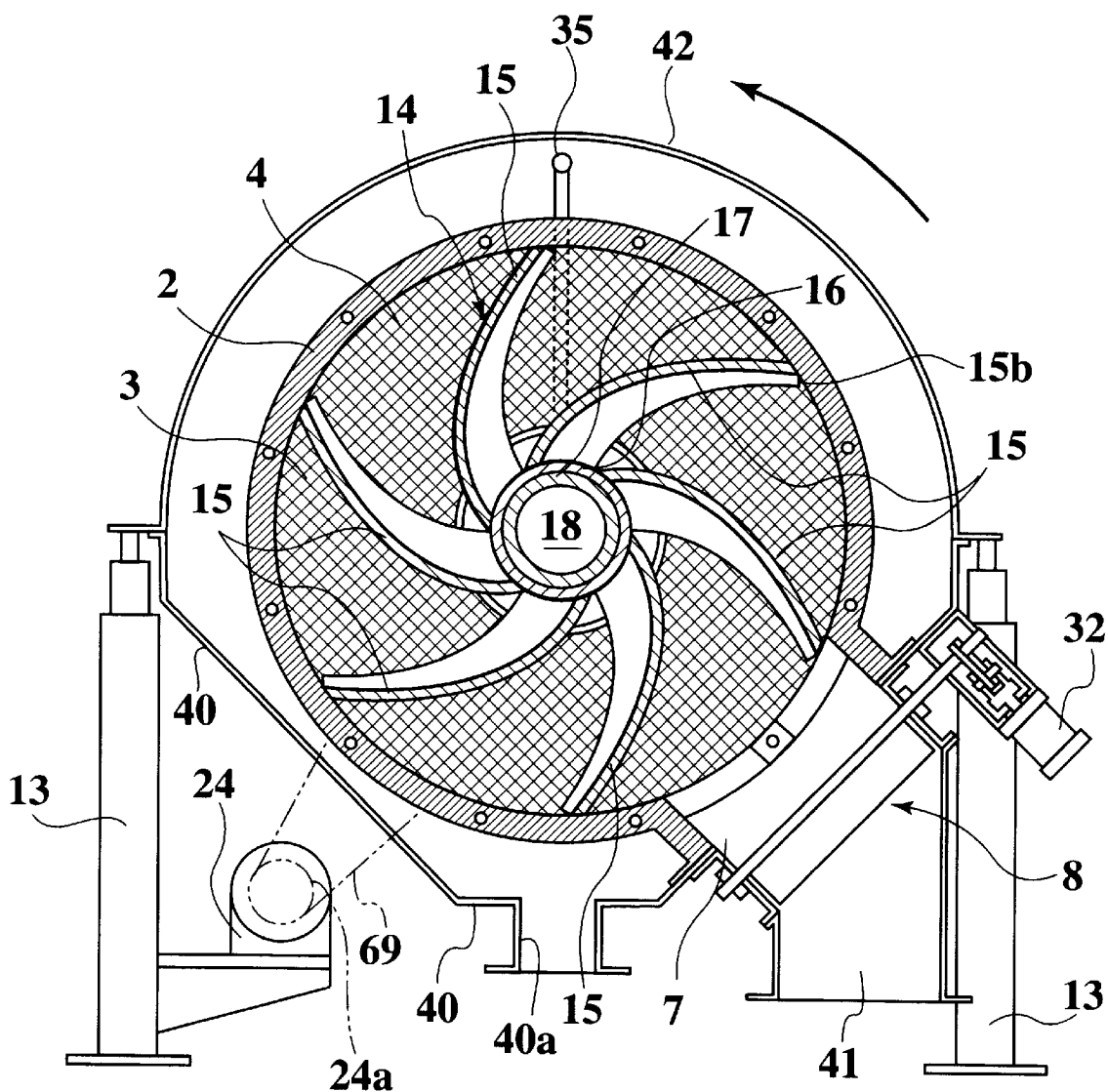
FIG. 2 is a cross-section view along the line II—II of FIG. 1.
Figure 7:
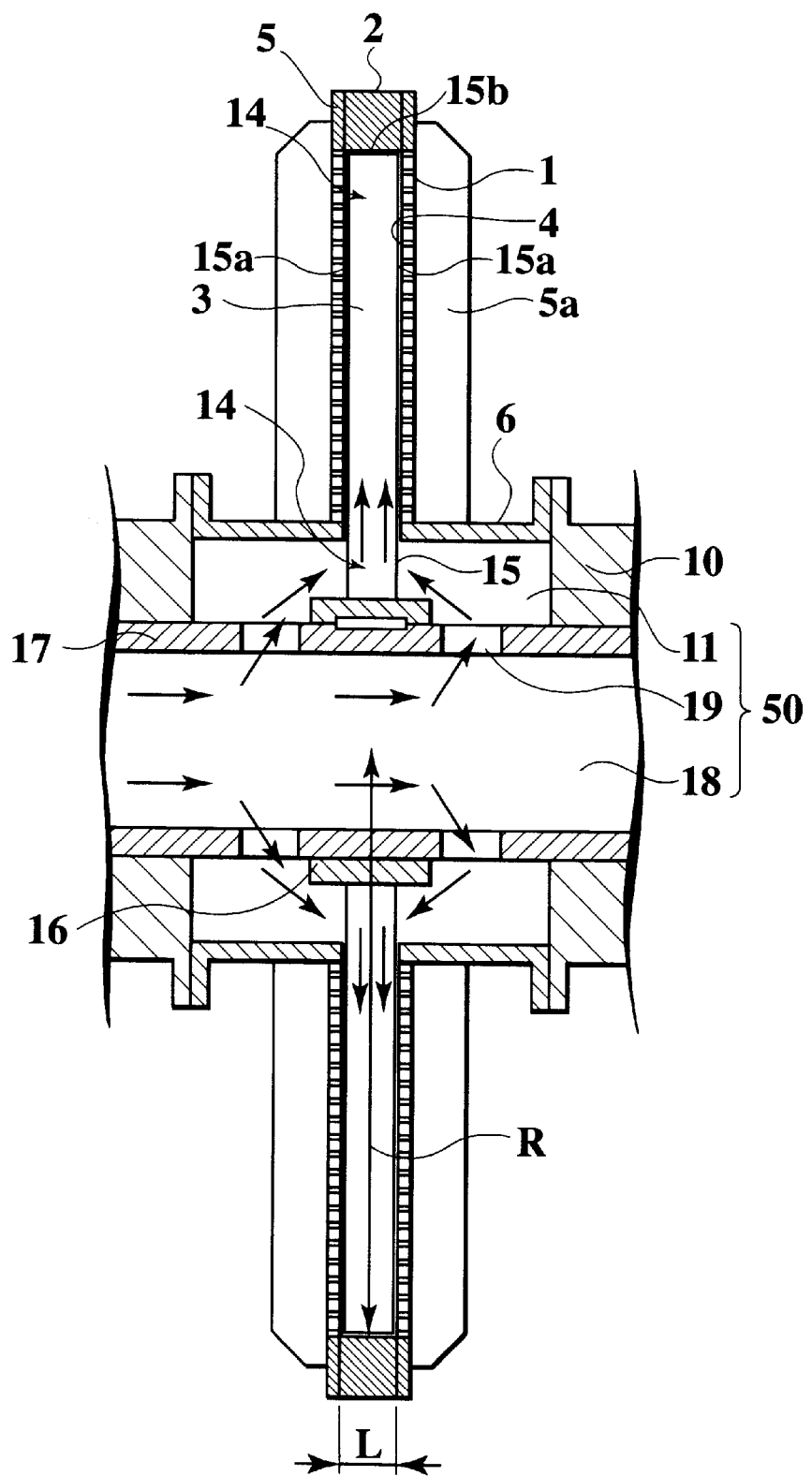
FIG. 7 is partially enlarged view of FIG. 1.

As shown in FIG. 2 and FIG. 7, the vaned wheel 14 is formed by a boss 16 and a plurality (6 in the embodiment shown in FIG. 2) of vanes 15. The boss 16 is fitted into and fixed to the outer periphery of the drive shaft 17 between the supporting tubes 10, 10, and the vaned wheel rotates in concert with the drive shaft 17. The vane iSis disposed within the filter chamber 3, and extends outward toward the annular plate in a radial manner. Each vane 15 has two side edges 15a, 15a that face the filter plates 1, 1 and an end edge 15b that face the annular plate 2.

The supply path 50 is formed by a main supply path 18, a supply port 19, and a linking path 11. The main supply path 18 passes through the inside of the drive shaft 17. The supply port 19 is formed in the drive shaft 17 on both sides of the boss 16 and opens toward the main supply path 18. The linking path is adjacent to the drive shaft 17 and is delineated by the drive shaft 17, the supporting tubes 10 and the inner frame 6. The linking path 11 links the supply port 19 and the filter chamber 3.

As shown in FIG. 1, one end of the drive shaft 17 is connected to a sludge tank 22, via a free joint 20, a supply pipe 21, and a supply pump 23. The other end of the drive shaft 17 is connected to a back flow pipe 44 via a free joint 51.

Raw fluid (sludge) in the sludge tank 22 is sent into the main supply path 18 by the supply pump 23. As shown in FIG. 7, raw fluid in the main supply path 18 passes through the supply port 19 and the linking path 11, and flows into the filter chamber 3. The supply pressure into the filter chamber 3 by the supply pump is set to a value, for example, in the range from 0.1 kg/cm² to 0.7 kg/cm².

The raw fluid that has flowed into the filter chamber 3 is subjected to the pressure from the supply pump and the action of the rotation of the vane 15, so that it moves toward the annular plate 2. When this occurs, water content (filtered fluid) passes through the two filter plates 1, 1, and is ejected from the inside of the filter chamber 3, the cake remaining in the filter chamber 3 being subjected to pressure from the operative surface 52 of the vane 15, to be described later, so that it moves toward the annular plate 2 as it is compressed. In the process of being compressed, water content is successively ejected from the filter plate 1. In proximity to the annular plate 2, the water content of the cake is minimum.

As shown in FIG. 7, the side edge 15a of the vane 15 is in proximity to the screen 4. By the action of the side edge 15a of the rotating vane 15, a cake on the inside surface of the screen 4 is scraped away, so that the screen 4 is constantly being renewed. The side edge 15a can also be disposed so as to be in contact with the screen 4.

Figure 9:
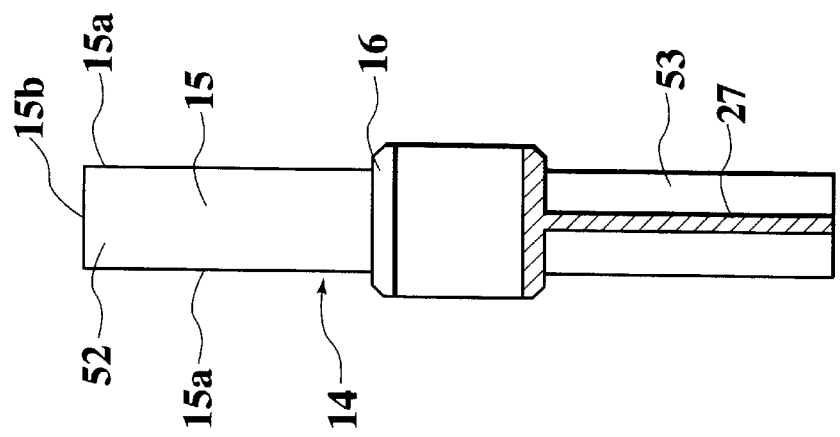
FIG. 9 is a cross-section view showing the condition in which a scraper is mounted to a vaned wheel.

As shown in FIG. 9, it is possible to provide a rubber or resin scraper 26 on the side edge 15a of the vane, for the purpose of scraping off the cake. By doing this, it is possible to better remove the cake from the screen 4. The scraper 26 can also be disposed so as to be in contact with the screen 4.

As shown in FIG. 10, each vane 15 is a curved plate having a substantially uniform thickness, and having an operative surface 52 on the side toward the direction of rotation and a rear surface 53 to the rear of the direction of rotation. The operative surface 52 viewed in cross-section with a cutting plane perpendicular to the drive shaft 17 can be represented by a reference curved line 54 extending from the drive shaft 17. The shape of the line of the operative surface 52 in cross-section with a cutting plane perpendicular to the drive shaft 17 is not dependent upon the position of the cutting plane in the axial direction of the drive shaft 17, and is substantially uniform. A tangent line at an arbitrary point on the reference curved line 54 is inclined in the rearward direction with respect to the direction of a straight line 57 passing through the arbitrary point and the center of the drive shaft 17.

A vane 15 shaped as noted above has a function of sending a cake in a radial direction, and a function of generating a filtering force with respect to the cake. The filtering force with respect to the cake is obtained as a force of repulsion with respect to a sliding resistance between the vane 15 and the filter plate 1 (screen 4).

If the angle α of intersection (lag angle) between the tangent line 56 and the straight line 57 is small, the sliding resistance of the cake with respect to the operative surface 52 becomes larger than the sliding resistance of the cake with respect to the screen 4, making it easier for the cake to rotate in concert with the vane 15. If, however, the lag angle α is large, the spacing between adjacent vanes 15 becomes small, and becomes easy for the cake to rotate in concert. In order to effectively limit the cake from rotating with the vane and to achieve the effect of moving the cake, it is preferable that the lag angle α be made at least 200 and no greater than 50°, and more preferable that it be made at least 300 and no greater than 45°.

Figure 3:
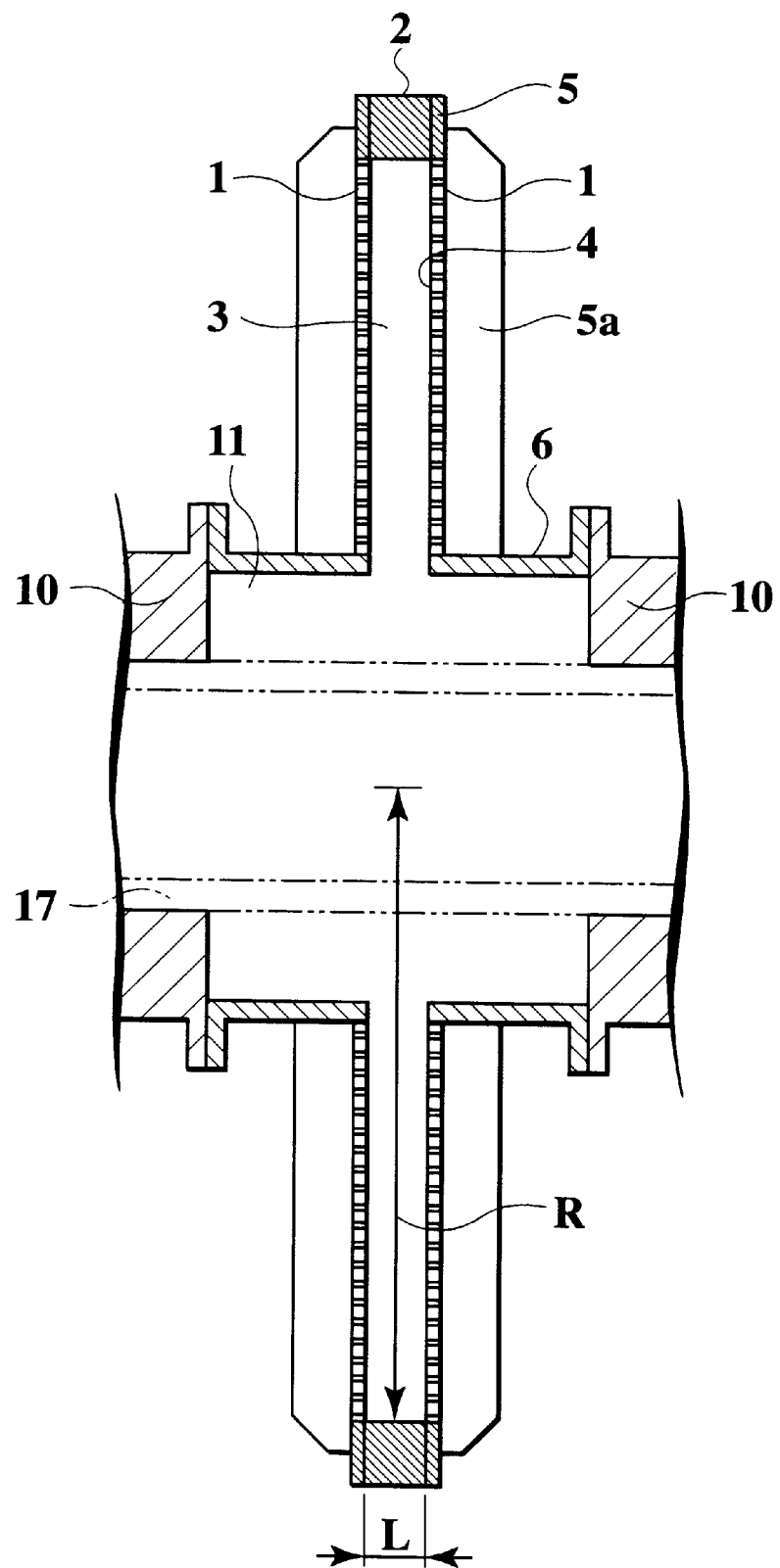
FIG. 3 is a cross-section view showing the filter chamber.

The number of vanes 15 is best made large, so as to generate a filtering force. However, as the number of vanes increases, because of the narrow spacing between the vanes 15, it becomes easy for the cake to rotate in concert, thereby sacrificing the function of sending the cake. Therefore, the number of vanes 15 is established so as to achieve both good sending of the cakes and effective generation of a filtering force. Specifically, for a lag angle α set to a prescribed value, the number of vanes 15 should be set to a number for which the distance D from an end edge 15a of one vane 15 to the operative surface 52 of another, adjacent vane 15 to the rear thereof with respect to the rotational direction, is greater than the width L of the filter chamber 3 (distance between filter plates 1, 1) shown in FIG. 3.

Figure 8:
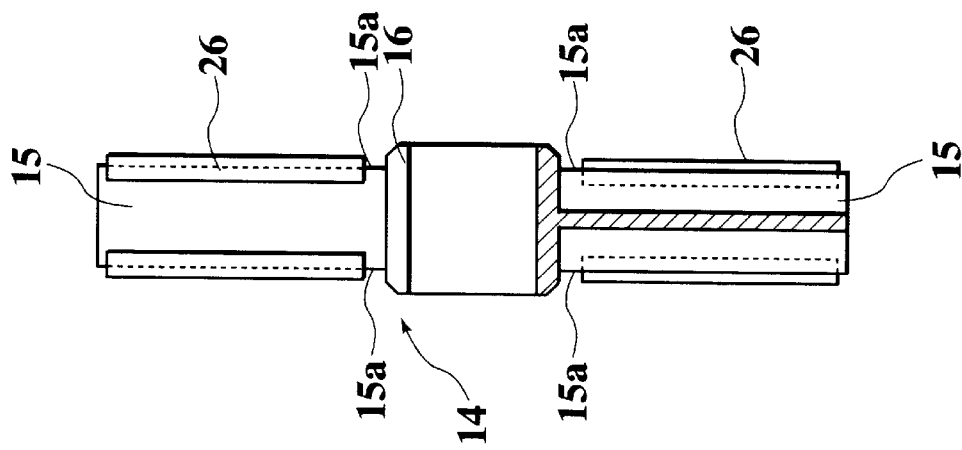
FIG. 8 is a cross-section view of a vaned wheel.

As shown in FIG. 8 and FIG. 10, a reinforcing plate 27 for reinforcing the vane 15 is fixed to the rear surface 53 of each vane 15, along the center line of the vane 15. The reinforcing plate 27 is disposed substantially parallel to the screen 4 (refer to FIG. 1), and protrudes from the rear surface 53. The amount of protrusion of the reinforcing plate 27 from the rear surface 53 should be large in order to reinforce the vane 15, and should be small in order to limit the rotation in concert of the cake attributed to the reinforcing plate 27. In order to both provide good reinforcement of the vane 15 and minimization of rotation in concert of the cake, the height of the protrusion of the reinforcing plate 27 from the rear surface 53 is set so as to gradually be reduced from the boss 16 towards the end edge 15b.

On the operative surface 52 a coating made of a material having lubricating qualities and resistance to wear, such as Teflon™, Nylon™, or a high polymer resin can be applied.

By doing this, the sliding resistance of the cake with respect to the operative surface 52 is reduced, making it easier to transport the cake.

Figure 13:
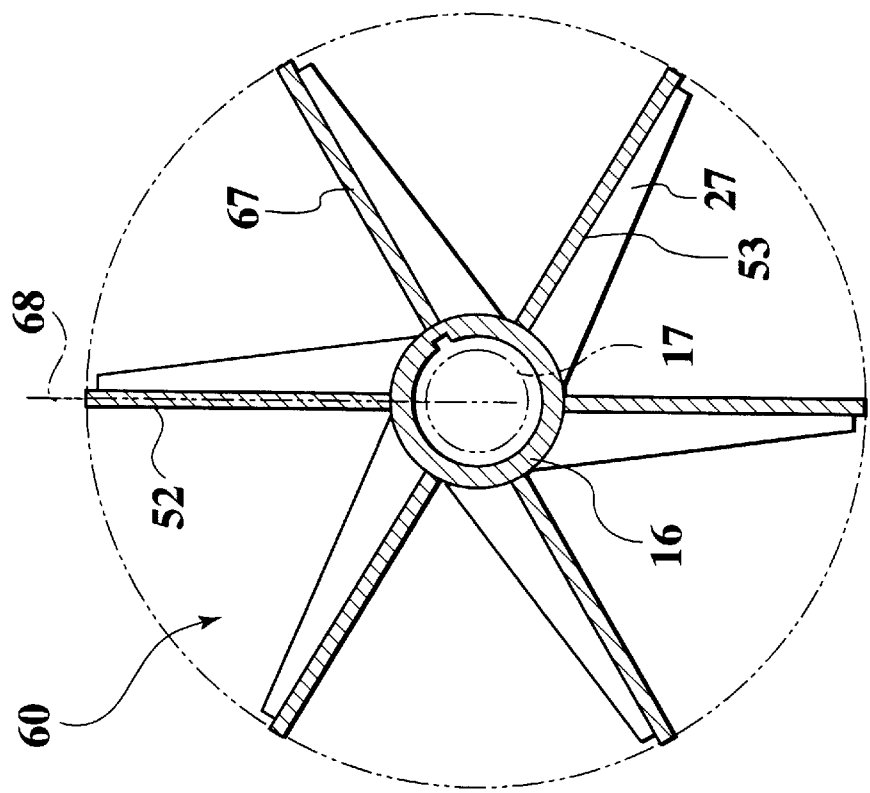
FIG. 13 is a front view showing yet another aspect of a vaned wheel.
Figure 12:
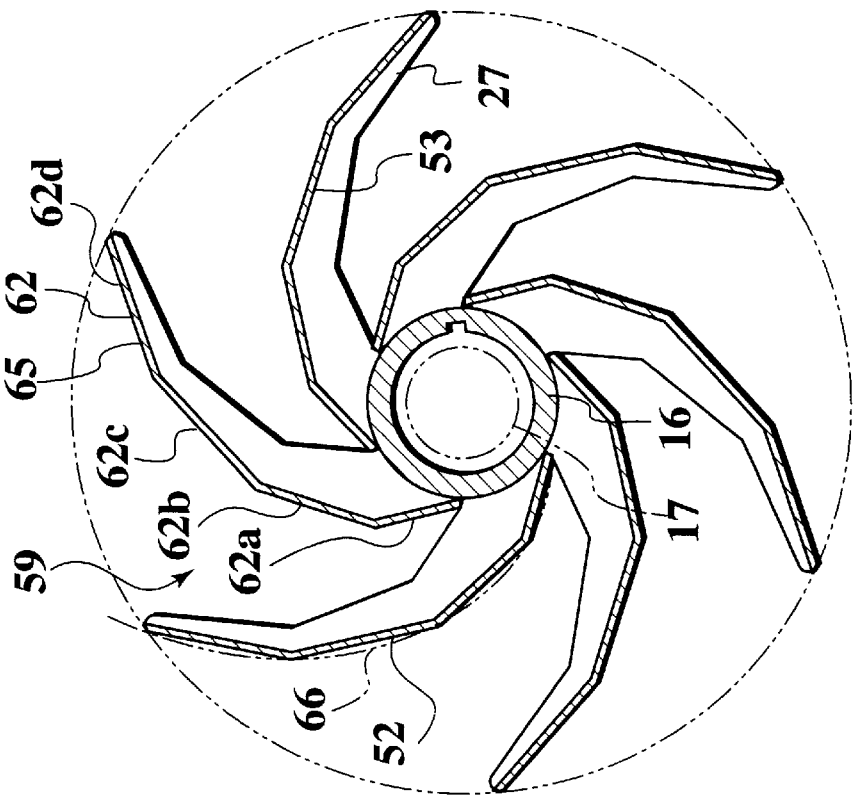
FIG. 12 is a front view showing yet another aspect of a vaned wheel.

FIG. 11 to FIG. 13 show examples of vaned wheels 58, 59, and 60 in place of the vaned wheel 14.

A vane 63 of the vaned wheel 58 of FIG. 11 differs from the vane 15 of FIG. 10 in its lag angle α and the number of vanes. The reference curved line 64 of the vane 63 is made a logarithmic spiral curve, and the number of vanes 63 is 4. A logarithmic spiral curve is one in which the lag angle α and the wedge angle β are constant, regardless of the position on the curve. The wedge angle β is the angle of intersection between the normal line 61 and the tangent line 56, the sum of the lag angle α and the wedge angle β making a right angle. By keeping the lag angle a constant, the rotating wedge force of the vane 63 and the force that acts to move the cake in the radial direction in proximity to the annular plate 2, at which the water content of the cake is lowered increase, thereby applying a large shear force to the cake. In the same manner as the vane 15 of FIG. 10, the distance D from an end edge of one vane 63 to the operative surface 52 of another, adjacent vane 63 to the rear with respect to the direction of rotation is larger than the width L of the filter chamber 3.

A vane 65 of the vaned wheel 59 of FIG. 12 is different from the vane 15 of FIG. 10, in that the operative surface 52 thereof has a piecewise linear curve 62 having a plurality (four) line segments 62a, 62b, 62c, and 62d that approximate a reference curve 66. The reference curve 66 is a logarithmic spiral curve having a lag angle of 35°. With a vane 59 such as this, because there is no need for form the vane 65 into a curve, manufacturing is facilitated, and strength is increased. Although the number of line segments in the piecewise linear curve 62 is not particularly restricted, it should be at least two but no greater than ten.

A vane 67 of the vaned wheel 60 of FIG. 13 is different from the vane 15 of FIG. 10 in that the operative surface 52 cross-section is represented by a line along a reference straight line 68 passing through the center of the drive shaft 17. Depending upon the properties of the raw fluid (sludge) to be filtered, it is possible to use this type of flat plate vane 67 as well. If the operative surface 52 is substantially parallel to the reference straight line 68, condition in which there is substantial coincidence with the reference straight line 68 is included.

In the vaned wheels 58, 59, and 60 of FIG. 11 to FIG. 13 as well, similar to the vaned wheel 14 of FIG. 10, the vanes 63, 65, and 67 have two side edges facing the filter plates 1, 1 and an end edge facing the annular plate 2. Each of the vanes He 63, 65, and 67 is made of a plate having a substantially uniform thickness, and has an operative surface 52 in the forward direction of rotation and a rear surface 53 to the rear with respect to the direction of rotation. The shape of the line of the operative surface 52 in cross-section with a cutting plane perpendicular to the drive shaft 17 is not dependent upon the position of the cutting plane in the axial direction of the drive shaft 17, and is substantially uniform. A reinforcing plate 27 is fixed to the rear surface of each of the vanes 63, 65, and 67.

As shown in FIG. 1 and FIG. 2, a pulley 25 is fitted into and fixed to the outer periphery of one end of the drive shaft 17. This pulley 25 is linked to a drive pulley 24a of a drive apparatus 24 by a belt 69. The; rotational drive force of the drive apparatus 24 is transmitted to the drive shaft 17 via the pulley 24a, the belt 69, and the pulley 25, so that the vaned wheel 14 within the filter chamber. 3 rotates in concert with the drive shaft 17.

The supply pump 23 pumps raw fluid from the main supply path 18 inside the drive shaft 17 into the filter chamber 3 at a pressure of, for example, 0.1 to 0.7 kg/cm$^2$. The raw fluid inside the filter chamber 3 is first pressed against the filter plates 1, ion both sides by this inflow pressure, and is filtered. The drive apparatus 24 causes the vaned wheel 14 to rotate at a circumferential speed of, for example, 100 to 500 mm/minute. The raw fluid inside the filter chamber 3 is transported toward the annular plate 2 as it is compressed by the operative surface 52 of the rotating vane 15. When this occurs, the filtered fluid is successively ejected from the filter plate 1. As a result, in a substantially triangular space formed between the operative surface 52 of the vane 15 and the annular plate 2, water content is removed from the raw fluid and a compressed cake collects.

As shown in FIG. 2, on the bottom of the annular plate 2, a substantially rectangular ejection port 7 is formed for the purpose of ejecting a cake inside the filter chamber 3. A back-pressure adjustment valve (valve mechanism) 8 that increasing and decreases the opening amount of the ejection port 7 is provided on this ejection port 7. Downstream from the back-pressure adjustment valve 8 is disposed cake chute 41.

Because of the need to remove a cake beforehand when the apparatus is to be stopped for a long period of time, the ejection port 7 is preferably disposed on the lower half peripheral region of the annular plate 2. To prevent contact between a cake that is ejected from the ejection port 7 and filtered fluid ejected from the filter plate 1, it is preferable that the ejection port 7 be disposed at a position on the annular plate 2 that is inclined at substantially 45° from vertical.

Figure 14:
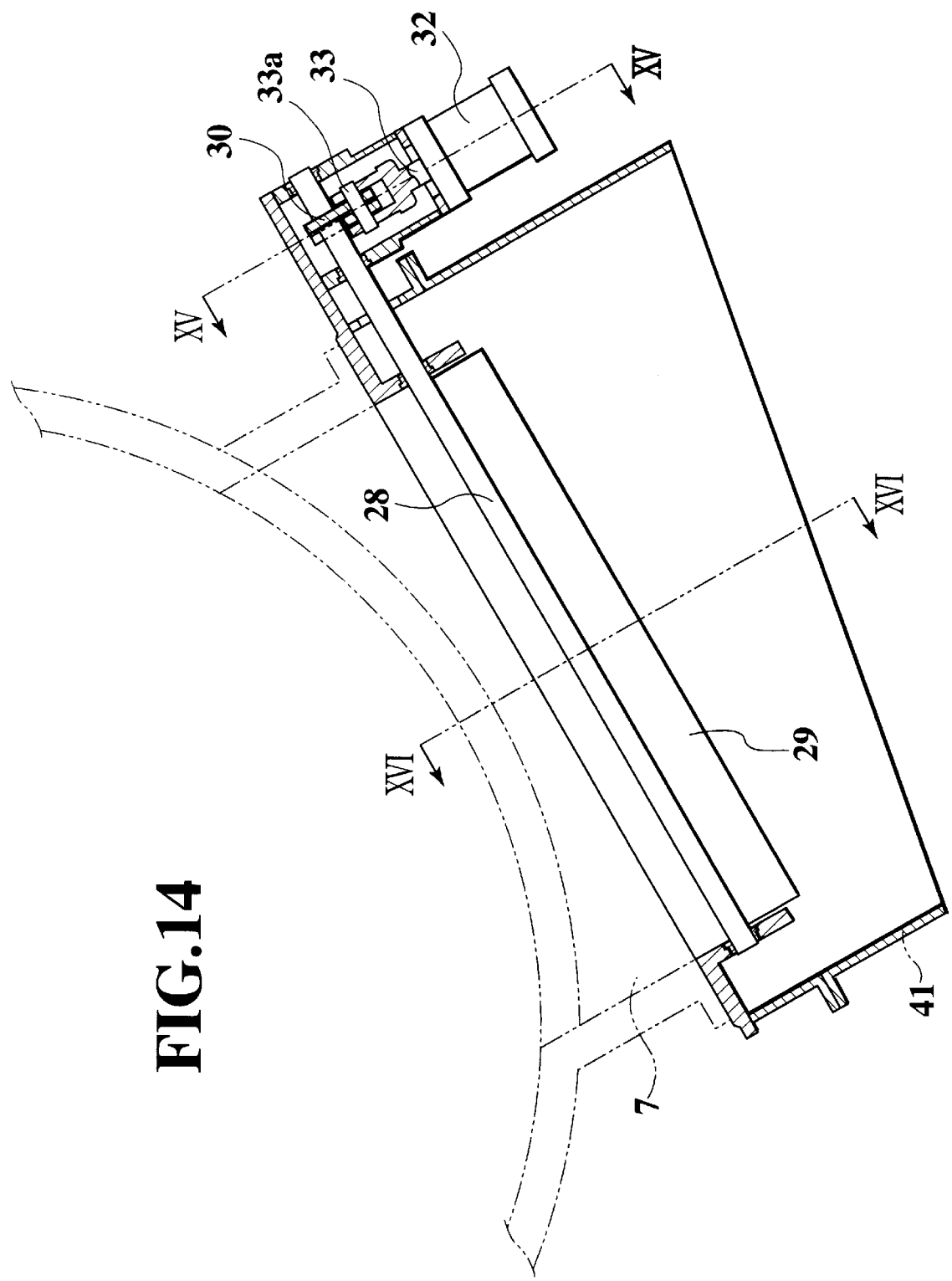
FIG. 14 is an enlarged view of FIG. 2 showing a back-pressure adjustment valve.
Figure 15:
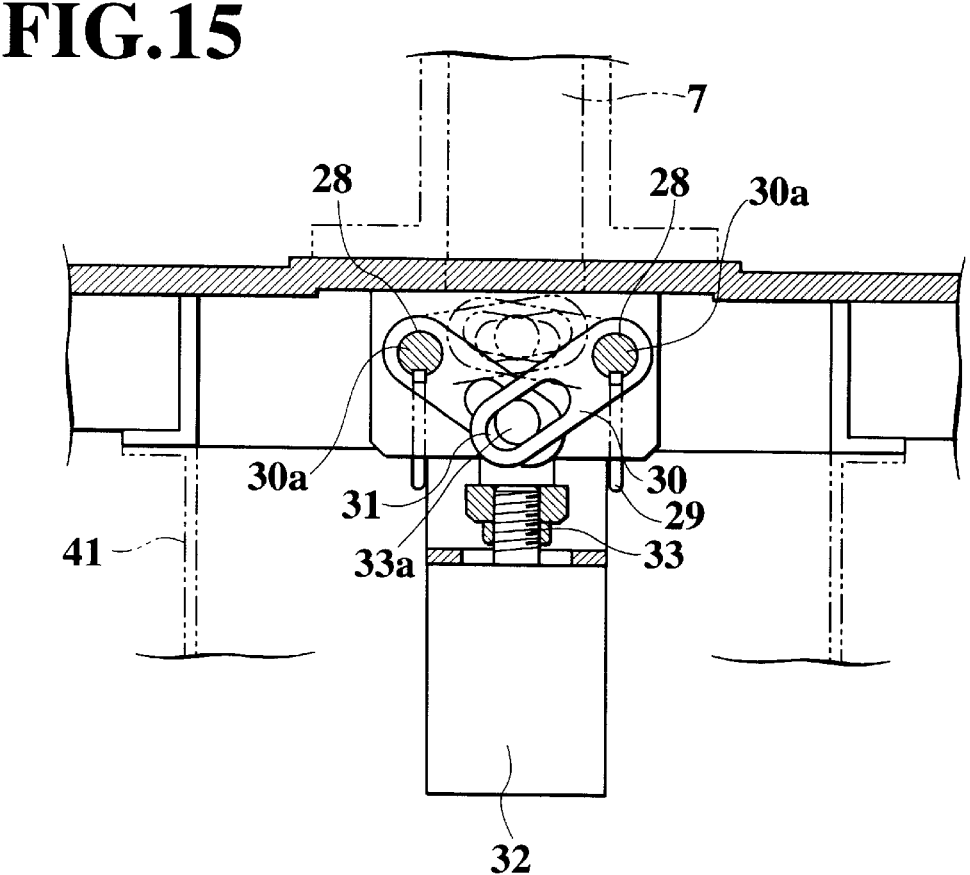
FIG. 15 is a cross-section view along the line XV—XV of FIG. 14.
Figure 16:
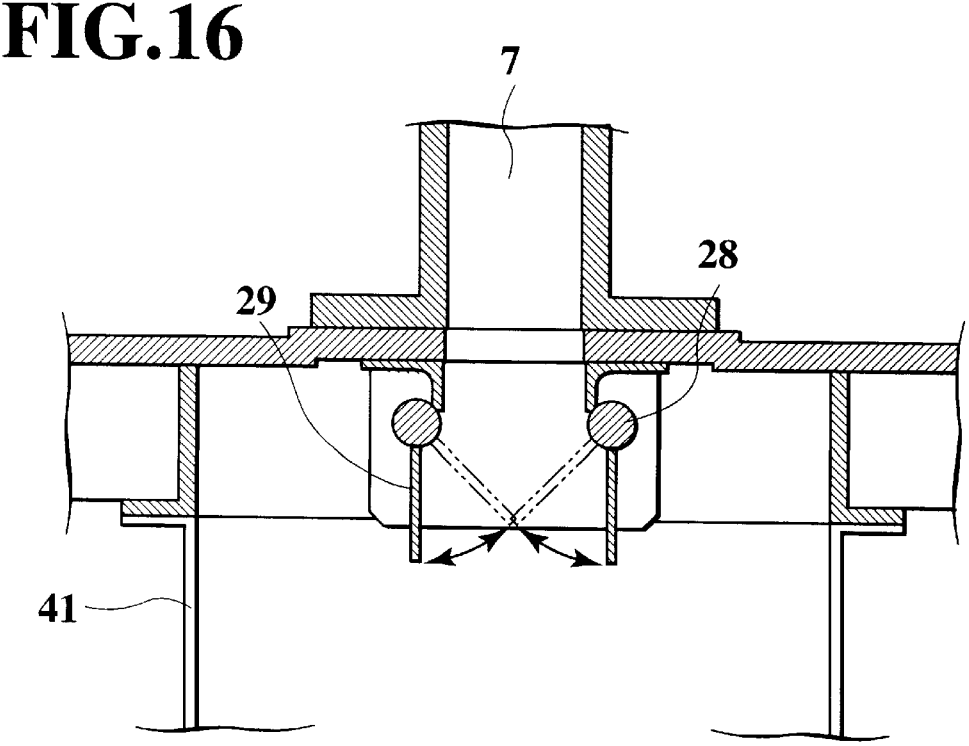
FIG. 16 is a cross-section view along the line XVI—XVI of FIG. 14.

As shown in FIG. 14, FIG. 15, and FIG. 16, the back-pressure adjustment valve 8 has a pair of rotating shafts 28, 28 rotatably supported with respect to the opposing edge of the ejection port 7, a pair of dampers 29, 29 fixed to each of the rotating shafts 28 which open and close the ejection port 7, a cylinder 32 having a rod 33, and two links 30, 30 that link the rod 33 and the rotating shafts 28, 28, convert the reciprocating motion of the rod 33 to rotational motion of the rotating shafts 28, 28 and transmit this motion. As shown in FIG. 15, a fixing hole 30a, into which the rotating shaft 28 is passed and fixed, is formed on one end of each of the links 30. On the other end of each of the links 30 is formed an elongated hole 31, these holes being mutually superposed. The shaft 33a that is fixed to the rod 33 is rotatably passed through the elongated holes 31. By doing this, when the rod 33 extends, the dampers 29, 29 rotate so as to approach one another (the closing direction), and when the rod 33 retracts, the dampers 29, 29 rotate so as to retract from one another (the opening direction). Because of the rotational frictional force of the vaned wheel 14 and the stopping down of the ejection port 7, back pressure is developed within the filter chamber 3. By the application of back pressure to the cake, the cakes are continuously compressed and dewatered, and ejected from the ejection port 7.

Figure 17:
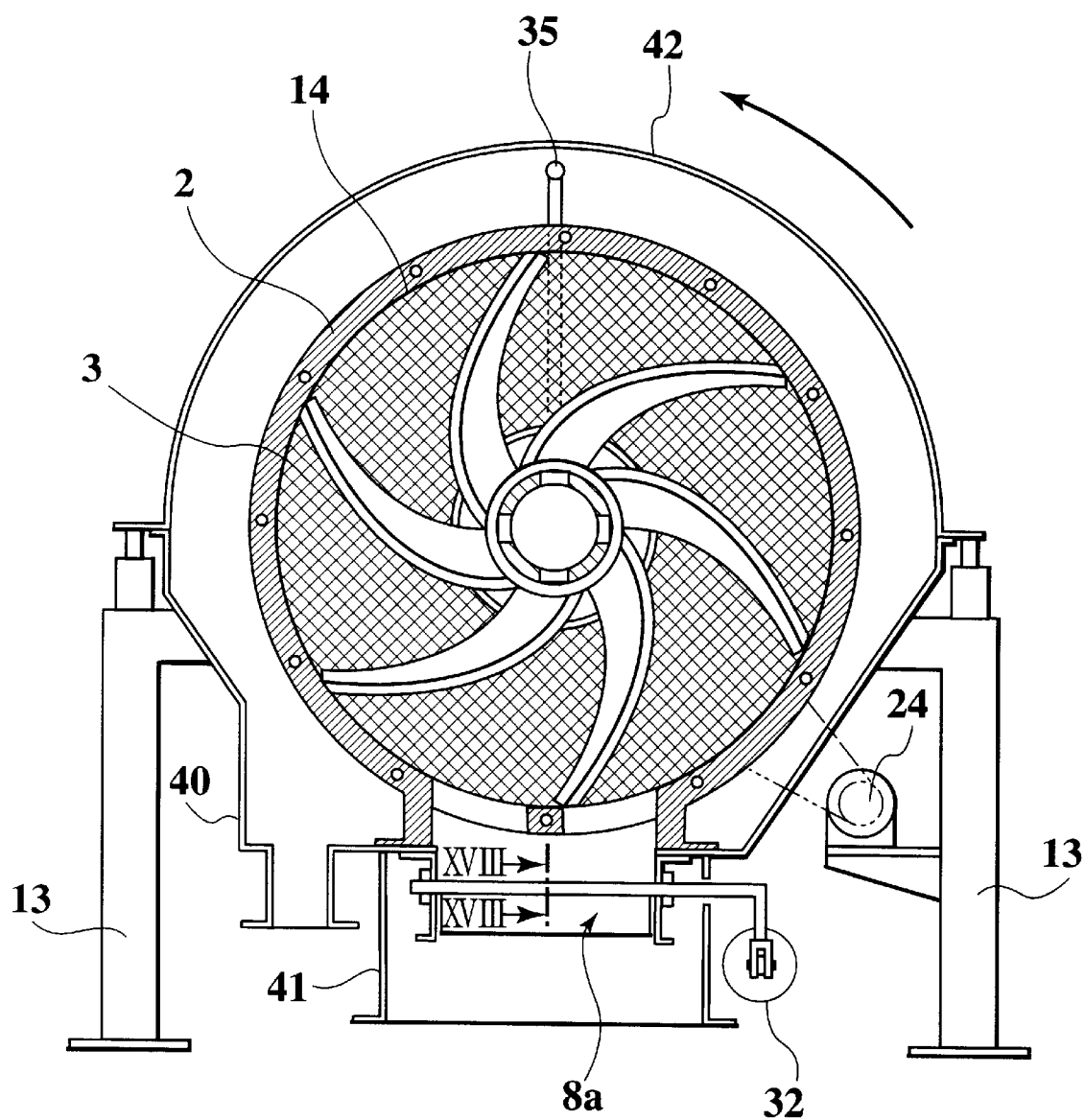
FIG. 17 is a cross-section view showing another aspect of a back-pressure adjustment valve.
Figure 18:
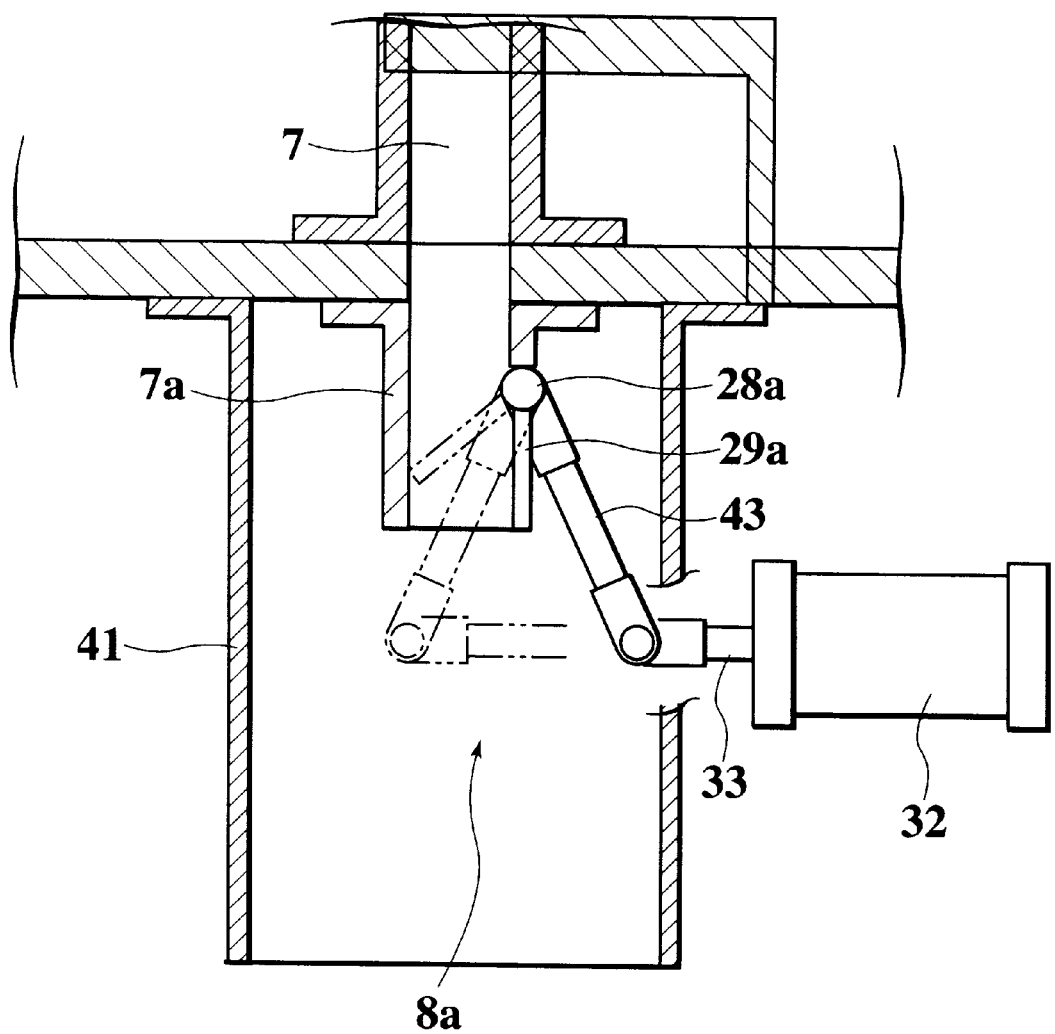
FIG. 18 is a cross-section view along the line XVIII—XVIII of FIG. 17.

FIG. 17 and FIG. 18 show another example of a back-pressure adjustment valve 8a. The back-pressure adjustment valve 8a has a rotating shaft 28a rotatably supported with respect to an edge of a member 7a forming a lower edge of the ejection port 7, a damper 29a fixed to the rotating shaft 28a and which opens and closes the ejection port 7, a cylinder 32 having a rod 33, a lever 43 linking the rod 33 and the rotating shaft 28a, which converts the reciprocating motion of the rod 33 to rotational motion of the rotating shaft 28a and transmits this motion. One end of the lever 43 is fixed to the rotating shaft 28a, and the other end of the lever 43 is rotatably linked to the rod 33. The lever 43 is configured so to freely expand and contract itself. When the rod 33 expands, the damper 29a rotates in the opening direction, and when the rod 33 contracts, the damper 29a rotates in the closing direction.

The back-pressure adjustment valves 8, 8a can also have a means for detecting the pressure within the filter chamber 3. Specifically, a sensor for detecting the pressure within the filter chamber 3 can be fixed to an inside surface of the annular plate 2. If the opening of the ejection port 7 is adjusted in response to the detected value from the sensor (pressure within the filter chamber 3), it is possible to adjust the water content of the cake ejected from the ejection ports 7, 7a so as to be more uniform. It is also possible to provide a control circuit for controlling the cylinder 32 in response to the detected value from the sensor.

As shown in FIG. 1 and FIG. 2, cleaning nozzles 34 for cleaning the screen 4 is disposed on the outside of the filter plates 1, 1 above the drive shaft 17. Each cleaning nozzle 34 is fixed to a cleaning water pipe 35. The end part of the cleaning water pipe 35 is linked to a cleaning water supply pipe via a swivel joint 36. A pulley 38 is fixed to the outer periphery at the end part of the cleaning water pipe 35, this pulley 38 being linked to a drive apparatus 39. The drive apparatus 39 causes the cleaning water pipe 35 to undulate via the pulley 38. By doing this, the cleaning nozzles 34 reciprocally move over the outer surface of the filter plates 1, 1, so as to spray cleaning water onto the screen 4.

The filter chamber 3 at the top of the drive shaft 17 (filter plates 1, 1 and annular plate 2) and the cleaning nozzles 34 are covered by a cover 42 to prevent spraying of the cleaning water. The end part of the cleaning water pipe 35 is passed through the cover 42. The filter chamber 3 at the bottom of the drive shaft 17 (filter plates 1, 1 and annular plate 2) is covered by a trough 40 for receiving filtered fluid. Filtered fluid ejected from the screen 4 flows out of an ejection port 40a formed in the bottom part of the trough 40.

A method of using an apparatus configured as described above is as follows.

At start of use, when the filter chamber 3 is empty, the vaned wheel 14 is caused to rotate at a very low speed with the ejection port 7 closed, as raw fluid (sludge) is supplied to the filter chamber 3. When this is done, the rotational speed of the vaned wheel is set in the range, for example, from 100 to 500 mm/minute, and the raw fluid supply pressure is set in the range, for example, of 0.1 to 0.7 kg/cm$^2$. Raw fluid that has flowed into the filter chamber 3 receives the above-noted supply pressure and the pressure from the operative surface 52 of the vane 15 and is transported under pressure in the direction of the outer periphery. When this occurs, the screens 4, 4 of the filter plates 1, 1 successively filter the raw fluid. Concentration of raw fluid immediately after it flows into the filter chamber 3 is mainly done by the above-noted supply pressure. The vaned wheel 14 presses on the raw fluid with a force that exceeds the sliding friction force between the concentrated raw fluid and the filter plates 1, 1, so that the raw fluid is pushed outward in the radial direction as it is dewatered, by the supply pressure and the rotating wedge force of the vane 15 having a lag angle of $\alpha$. As a result, the raw fluid is turned into a cake, as the cake, moving along a curved line, is subjected to a shear force.

After the elapse of a prescribed amount of time, when the filter chamber 3 is filled with a cake and the pressure therein rises, the ejection port 7 is opened by a prescribed amount. By doing this, the compressed cake receives back pressure from the ejection port 7 and is ejected. With the pressure in the filter chamber 3 adjusted, cakes of a desired water content are continuously ejected.

By providing a scraper 26 in contact with the screen 4 at the edge of the vane 15, it is possible to reliably prevent the occurrence of clogging of the screen 4, making continuous operation possible.

When operation is ended, cleaning water discharged from the cleaning nozzle 34 cleans the raw fluid (sludge) attached to the filter plates 1, 1, whereupon the apparatus is stopped.

Another embodiment of the present invention is described below.

Figure 19:
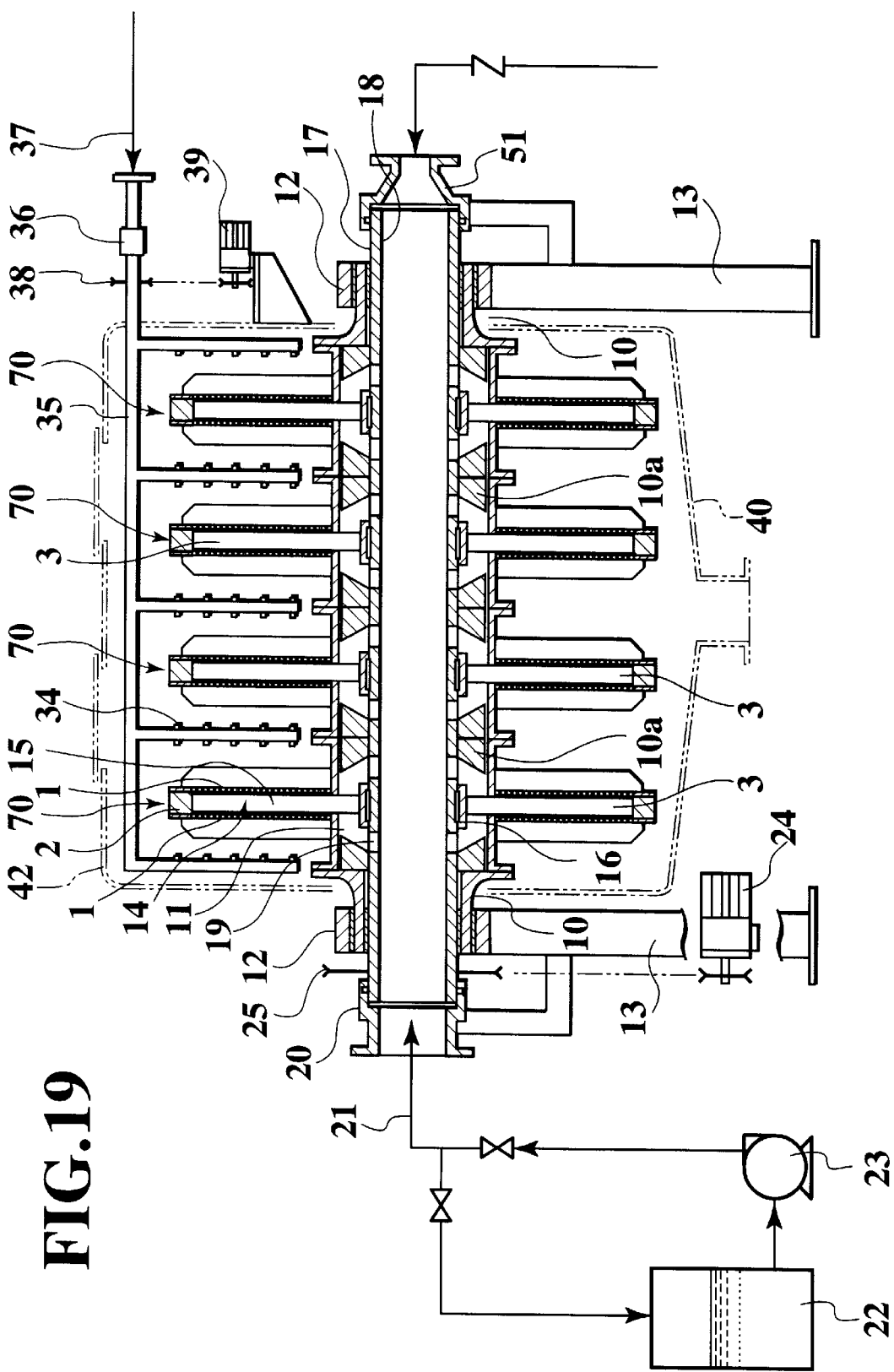
FIG. 19 is a cross-section view of a continuous compression-type dewatering apparatus according to another embodiment of the present invention.

FIG. 19 shows a continuous compression-type dewatering apparatus having a plurality of filter chambers 3 arranged in parallel. Parts of this apparatus that are the same as those in FIG. 1 are assigned the same reference symbols, and will not be described herein.

The apparatus of FIG. 19 has a plurality of filter units 70 provided in parallel, and a drive shaft 17. Each filter unit 70 has a filter chamber 3 delineated by an annular plate 2 and two filter plates 1, 1, and a vaned wheel 14 disposed inside the filter chamber 3.

The plurality of annular plates 2 are disposed about a common center axis. The drive shaft 17 passes through the annular plates 2 and through the inside of the filter chambers 3, and is freely rotatable with respect to the filter chambers 3. The drive shaft 17 is supported on a frame 13 by supporting tubes 10, 10a, and 10b.

The vaned wheel 14 is fixed to the drive shaft 17 and rotates in concert with the drive shaft 17. Inside the drive shaft 17 is formed a main supply path 18 which supplies raw fluid to each of the filter chambers 3. Each vane 15 of the vaned wheels 14 has two side edges facing the filter plates 1, 1, and an end edge facing the annular plate 2.

Each of the filter plates 1 includes a screen for separating the raw fluid into filtered fluid and a cake. The annular plate 2 includes an ejection port for the cake. The screen and the ejection port are configured the same as shown in FIG. 2.

The inflow pressure of the raw fluid from the main supply path 18 into the filter chamber 3 and the rotation of the vane 15 causes the filtered fluid to flow to the outside of the filter chamber 3 from the screen 4, a cake remaining inside the filter chamber 3 being pushed to the outside of the filter chamber 3 from the ejection port 7.

According to an apparatus configured in this manner, by a plurality of filter chambers 3, it is possible to simultaneously process a large amount of sludge. Because the placement is that of the filter chambers 3 being aligned in a row, the space occupied by the apparatus is reduced.

IN INDUSTRIAL APPLICABILITY

As described above, a continuous compression-type dewatering apparatus according to the present invention is useful in continuous compression-type dewatering of concentrated sludge, and is particularly suited to continuous compression-type dewatering of difficult-to-filter sludge, such as sewage sludge.

What is claimed is:

1. A continuous compression-type dewatering apparatus comprising:

a filter chamber (3) delineated by an annular plate (2) and two side plates (1,1);

a drive shaft (17) passing through a center axis of the annular plate (2), passing through the inside of the filter chamber (3), and freely rotatable with respect to the filter chamber (3);

a vane (15) disposed within the filter chamber (3), fixed with respect to the drive shaft (17), extending from the drive shaft (17) toward the annular plate (2), and rotating in concert with the drive shaft (17); and a supply path (50) passing through the drive shaft (17), supplying raw fluid to the filter chamber (3), wherein the vane (15) comprises two side edges (15a, 15a) facing the side plates (1,1) and an end edge (15b) facing the annular plate (2), at least one of the side plates (1,1) including a filter element (4) for separating the raw fluid into a filtered fluid and a cake, the annular plate (2) includes an ejection port (7) for the cake, the ejection port is provided with a valve mechanism (8) which increases and decreases an amount of opening of the ejection port (7), the valve mechanism (8) comprises a pair of rotating shafts (28, 28) rotatably supported with respect to an opposing edge of the ejection port (7), a pair of dampers (29, 29) fixed to each of the rotating shafts (28) which open and close the ejection port (7), a cylinder (32) having a rod (33), and two links (30, 30) that link the rod (33) and the rotating shafts (28, 28), convert reciprocating motion of the rod (33) to rotational motion of the rotating shafts (28, 28), and transmit this motion, and an inflow pressure of the raw fluid from the supply path (50) into the filter chamber (3) and rotation of the vane (50) causes the filtered fluid to flow out from the filter element (4) to the outside of the filter chamber (3), a cake that remains inside the filter chamber (3) being pushed to the outside of the filter chamber (3) via the ejection port (7).

2. A continuous compression-type dewatering apparatus according to claim 1, wherein the filter element (4) is disposed over substantially the entire region of the side plate (1).

3. A continuous compression-type dewatering apparatus according to claim 2, wherein the filter element (4) is a substantially donut-shaped screen having a large number of fine holes.

4. A continuous compression-type dewatering apparatus according to claim 3, wherein the side plate (1) comprises the screen (4), an annular outer frame (5) fixed to an outer periphery of the screen (4), an annular inner frame (6) fixed to an inner periphery of the screen (4), and a rib (5a) linking the outer frame (5) and the inner frame (6).

5. A continuous compression-type dewatering apparatus according to claim 1, wherein the annular plate (2) has, on an inner circumference thereof, a second filter element (9) for separating the raw fluid into the filtered fluid and the cake.

6. A continuous compression-type dewatering apparatus according to claim 5, wherein the second filter element (9) is a screen (9) having a large number of fine holes.

7. A continuous compression-type dewatering apparatus according to claim 1, wherein the vane (15) comprises an operative surface (52) in the forward direction with respect to the direction of rotation of the drive shaft (17), the operative surface (52) in cross-section with a cutting plane perpendicular to the drive shaft (17) is represented by a reference curved line (54, 64) extending from the drive shaft (17), and a line tangent to an arbitrary point on the reference curved line (54, 64) is inclined towards the rear of the rotational direction of the drive shaft (17) with respect to a straight line (57) passing through the arbitrary point and the center of the drive shaft (17).

8. A continuous compression-type dewatering apparatus according to claim 7, wherein the reference curved line (64) is a logarithmic spiral curve having an angle of intersection (a) between the tangent line (56) and the straight line (57) that is constant and not dependent upon the position of the arbitrary point.

9. A continuous compression-type dewatering apparatus according to claim 7, wherein the operative surface on the cross-section is a piecewise linear curve (62) having a plurality of straight line segments approximating the reference curved line to be the logarithmic spiral curve (66).

10. A continuous compression-type dewatering apparatus according to claim 1, further comprising a cleaning nozzle (34) disposed on an outside of the side plate (1) for cleaning the filter element (4).

11. A continuous compression-type dewatering apparatus according to claim 10, wherein the cleaning nozzle (3-4) is disposed so as to oppose the filter element (4) on the outside of the side plate (1).

12. A continuous compression-type dewatering apparatus according to claim 1, wherein the filter element (4) is, provided on each side plate (1).

13. A continuous compression-type dewatering apparatus according to claim 1, wherein the supply path (50) comprises a main supply path (18) inside the drive shaft (17), a supply port (19) formed in the drive shaft (17) and opening the main supply path (18), and a linking path (11) adjacent to drive shaft (17) on the side of the vane (15), linking the supply port (19) and the filter chamber (3), and the raw fluid flows from the main supply path (18), via the supply port (19) and linking path (11), into the filter chamber (3).

14. A continous compression-type dewatering apparatus according to claim 1, wherein the vane (15) comprises operative surface (52) in the forward direction with respect to the direction of rotation of the drive shaft (17), and the shape of the line of the operative surface in cross-section with a cutting plane perpendicular to the drive shaft (17) is not dependent upon the position of the cutting plane in the axial direction of the drive shaft (17), and is substantially uniform.

15. A continuous compression-type dewatering apparatus according to claim 1, wherein the vane (15) comprises an operative surface (52) in the forward direction with respect to the direction of rotation of the drive shaft (17), and the operative surface (52) in cross-section with a cutting plane perpendicular to the drive shaft (17) is represented by a line along a reference straight line (68) passing through the center of the drive shaft (17).

16. A continuous compression-type dewatering apparatus according to claim 1, wherein the vane (15) has a rear surface to the rear with respect to the direction of rotation of the drive shaft (17), and a reinforcing rib (27) reinforcing the vane (15) and protruding from the rear surface (53).

17. A continuous compression-type dewatering apparatus according to claim 1, wherein a scraper (26) is provided on at least one side edge (15a) of the vane (15), in proximity to the side plate (1).

18. A continuous compression-type dewatering apparatus according to claim 1, wherein the vane (15) has an operative surface (52) in the forward direction with respect to the direction of rotation of the drive shaft (17), and a coating of resin on the operative surface (52), wherein the operative surface (52) of the vane sends a cake in a radial direction and generates a filtering force with respect to the cake, the filtering force is obtained as a force of repulsion with respect to a sliding resistance between the vane (15) and the side plate (1).

19. A continuous compression-type dewatering apparatus comprising:

a filter chamber (3) delineated by an annular plate (2) and two side plates (1, 1);

a drive shaft (17) passing through a center axis of the annular plate (2), passing through the inside of the filter chamber (3), and freely rotatable with respect to the filter chamber (3);

a plurality of vanes (15, 15) disposed within the filter chamber (3), fixed with respect to the drive shaft (17), extending from the drive shaft (17) toward the annular plate (2), and rotating in concert with the drive shaft (17); and a supply path (50) passing through the drive shaft (17), supplying raw fluid to the filter chamber (3), wherein each vane (15) comprises two side edges (15a) facing the side plates (1, 1) and an end edge (I 5b) facing the annular plate (2), at least one of the side plates (1, 1) includes a filter element (4) for separating the raw fluid into a filtered fluid and a cake, the annular plate (2) includes an ejection port (7) for the cake, the ejection port is provided with a valve mechanism (8) which increases and decreases an amount of opening of the ejection port (7), the valve mechanism (8) comprises a pair of rotating shafts (28, 28) rotatably supported with respect to an opposing edge of the ejection port (7), a pair of dampers (29, 29) fixed to each of the rotating shafts (28) which open and close the ejection port (7), a cylinder (32) having a rod (33), and two links (30, 30) that link the rod (33) and the rotating shafts (28, 28), convert reciprocating motion of the rod (33) to rotational motion of the rotating shafts (28, 28), and transmit this motion, and an inflow pressure of the raw fluid from the supply path (50) into the filter chamber (3) and rotation of the vanes (15, 15) causes the filtered fluid to flow out from the filter element (4) to the outside of the filter chamber (3), a cake that remains inside the filter chamber (3) being pushed to the outside of the filter chamber (3) via the ejection port (7).

20. A continous compression-type dewatering apparatus according to claim 19, wherein the side plates (1, 1) are disposed so as to be substantially mutually parallel, with a distance (D) from an end edge (15b) of one vane (15) to an adjacent vane (15) to the rear thereof with respect to the direction of rotation established as being greater than a length (L) between the side plates (1, 1).

21. A continuous compression-type dewatering apparatus comprising:

a plurality of filter units (70) provided in parallel; and a drive shaft (17), wherein each filter unit (70) comprises a filter chamber delineated by an annular plate (2) and two side plates (1, 1) and a vane (15) disposed within the filter chamber (3), the annular plates (2, 2) are disposed around a common center axis and the drive shaft (17) passes through the center axis of the annular plates (2, 2) and through the inside of the filter chambers (3), and is free to rotate with respect to the filter chambers (3), the vane (15) is fixed with respect to the drive shaft (17), extends in a radial direction towards the annular plate (2), and rotates in concert with the drive shaft (17), a supply path (50) supplying raw fluid to each filter chamber (3) is formed inside the drive shaft (17), the vane (15) has two side edges (15a) facing the side plates (1, 1), and an end edge (15b) facing the annular plate (2), at least one of the side plates (1, 1) of each filter unit (70) includes a filter element (4) for separating the raw fluid into a filtered fluid and a cake, the annular plate (2) includes an ejection port (7) for the cake, the ejection port is provided with a valve mechanism (8) which increases and decreases an amount of opening of the ejection port (7), the valve mechanism (8) comprises a pair of rotating shafts (28, 28) rotatably supported with respect to an opposing edge of the ejection port (7), a pair of dampers (29, 29) fixed to each of the rotating shafts (28) which open and close with the ejection port (7), a cylinder (32) having a rod (33), and two links (30, 30) that link the rod (33) and the rotating shafts (28, 28), convert reciprocating motion of the rod (33) to rotational motion of the rotating shafts (28, 28), and transmit this motion, and an inflow pressure of the raw fluid from the supply path (50) into the filter chamber (3) and rotation of the vane (15) causes the filtered fluid to flow out from the filter element (4) to the outside of the filter chamber (3), a cake that remains inside the filter chamber (3) being pushed to the outside of the filter chamber (3) via the ejection port (7).

22. A continuous compression-type dewatering comprising:

a filter chamber (3) delineated by an annular plate (2) and two side plates (1, 1);

a drive shaft (17) passing through a center axis of the annular plate (2), passing through the inside of the filter chamber (3), and freely rotatable with respect to the filter chamber (3);

a vane (15) disposed within the filter chamber (3), fixed with respect to the drive shaft (17), extending from the drive shaft (17) toward the annular plate (2), and rotating in concert with the drive shaft (17); and a supply path (50) passing through the drive shaft (17), supplying raw fluid to the filter chamber (3), wherein the vane (15) comprises two side edges (15a, 15a) facing the side plates (1, 1) and an end edge (I 5b) facing the annular plate (2), at least one of the side plates (1, 1) including a filter element (4) for separating the raw fluid into a filtered fluid and a cake, the annular plate (2) includes an ejection port (7) for the cake, the ejection port is provided with a valve mechanism (8a) which increases and decreases an amount of opening of the ejection port (7), the valve mechanism (8a) comprises a rotating shaft (28a) rotatably supported with respect to the ejection port (7), a damper (29a) fixed to the rotating shaft (28a) that opens and closes the ejection port (7), a cylinder (32) having a rod (33), and a lever (43) that links the rod (33) and the rotating shaft (28a), converts reciprocating motion of the rod (33) to rotational motion of the rotating shaft (28a), and transmits this motion, and an inflow pressure of the raw fluid from the supply path (50) into the filter chamber (3) and rotation of the vane (50) causes the filtered fluid to flow out from the filter element (4) to the outside of the filter chamber (3), a cake that remains inside the filter chamber (3) being pushed to the outside of the filter chamber (3) via the ejection port (7).

23. A continuous compression-type dewatering apparatus according to claim 22, wherein the filter element (4) is disposed over substantially the entire region of the side plate (1).

24. A continuous compression-type dewatering apparatus according to claim 23, wherein the filter element (4) is a substantially donut-shaped screen having a large number of fine holes.

25. A continuous compression-type dewatering apparatus according to claim 24, wherein the side plate (1) comprises the screen (4), an annular outer frame (5) fixed to an outer periphery of the screen (4), an annular inner frame (6) fixed to an inner periphery of the screen (4), and a rib (5a) linking the outer frame (5) and the inner frame (6).

26. A continuous compression-type dewatering apparatus according to claim 22, wherein the annular plate (2) has, on an inner circumference thereof, a second filter element (9) for separating the raw fluid into the filtered fluid and the cake.

27. A continuous compression-type dewatering apparatus according to claim 26, wherein the second filter element (9) is a screen (9) having a large number of fine holes.

28. A continuous compression-type dewatering apparatus according to claim 22, wherein the vane (15) comprises an operative surface (52) in the forward direction with respect to the direction of rotation of the drive shaft (17), the operative surface (52) in cross-section with a cutting plane perpendicular to the drive shaft (17) is represented by a reference curved line (54, 64) extending from the drive shaft (17), and a line tangent to an arbitrary point on the reference curved line (54, 64) is inclined towards the rear of the rotational direction of the drive shaft (17) with respect to a straight line (57) passing through the arbitrary point and the center of the drive shaft (17).

29. A continuous compression-type dewatering apparatus according to claim 28, wherein the reference curved line (64) is a logarithmic spiral curve having an angle of intersection ($\alpha$) between the tangent line (56) and the straight line (57) that is constant and not dependent upon the position of the arbitrary point.

30. A continuous compression-type dewatering apparatus according to claim 28, wherein the operative surface on the above-noted cross-section is a piecewise linear curve (62) having a plurality of straight line segments approximating the reference curved line to be the logarithmic spiral curve (66).

31. A continuous compression-type dewatering apparatus according to claim 22, further comprising a cleaning nozzle (34) disposed on an outside of the side plate (1) for cleaning the filter element (4).

32. A continuous compression-type dewatering apparatus according to claim 31, wherein the cleaning nozzle (34) is disposed so as to oppose the filter element (4) on the outside of the side plate (1).

33. A continuous compression-type dewatering apparating according to claim 23, wherein the filter element (4) is provided on each side plate (1).

34. A continuous compression-type dewatering apparatus according to claim 22, wherein the supply path (50) comprises a main supply path (18) inside the drive shaft (17), a supply port (19) formed in the drive shaft (17) and opening the main supply path (18), and a linking path (11) adjacent to drive shaft (17) on the side of the vane (15), linking the supply port (19) and the filter chamber (3), and the raw fluid flows from the main supply path (18), via the supply port (19) and linking path (1I), into the filter chamber (3).

35. A continuous compression-type dewatering apparatus according to claim 22, wherein the vane (15) comprises an operative surface (52) in the forward direction with respect to the direction of rotation of the drive shaft (17), and the shape of the line of the operative surface in cross-section with a cutting plane perpendicular to the drive shaft (17) is not dependent upon the position of the cutting plane in the axial direction of the drive shaft (17), and is substantially uniform.

36. A continuous compression-type dewatering apparatus according to claim 22, wherein the vane (15) comprises an operative surface (52) in the forward direction with respect to the direction of rotation of the drive shaft (17), and the operative surface (52) in cross-section with a cutting plane perpendicular to the drive shaft (17) is represented by a line along a reference straight line (68) passing through the center of the drive shaft (17).

37. A continuous compression-type dewatering apparatus according to claim 22, wherein the vane (15) has a rear surface to the rear with respect to the direction of rotation of the drive shaft (17), and a reinforcing rib (27) reinforcing the vane (15) and protruding from the rear surface (53).

38. A continuous compression-type dewatering apparatus according to claim 22, wherein a scraper (26) is provided on at least one side edge (15a) of the vane (15), in proximity to the side plate (1).

39. A continuous compression-type dewatering apparatus according to claim 22, wherein the vane (15) has an operative surface (52) in the forward direction with respect to the direction of rotation of the drive shaft (17), and a coating of resin on the operative surface (52), wherein the operative surface (52) of the vane sends a cake in a radial direction and generates a filtering force with respect to the cake, the filtering force is obtained as a force of repulsion with respect to a sliding resistance between the vane (15) and the side plate (1).

40. A continuous compression-type dewatering apparatus comprising:

a filter chamber (3) delineated by an annular plate (2) and two side plates (1, 1);

a drive shaft (17) passing through a center axis of the annular plate (2), passing through the inside of the filter chamber (3), and freely rotatable with respect to the filter chamber (3);

a plurality of vanes (15, 15) disposed within the filter chamber (3), fixed with respect to the drive shaft (17), extending from the drive shaft (17) toward the annular plate (2), and rotating in concert with the drive shaft (17); and a supply path (50) passing through the drive shaft (17), supplying raw fluid to the filter chamber (3), wherein each vane (15) comprising two side edges (15a) facing the side plates (1, 1) and an end edge (15b) facing the annular plate (2), at least one of the side plates (1, 1) includes a filter element (4) for separating the raw fluid into a filtered fluid and a cake, the annular plate (2) includes an ejection port (7) for the cake, the ejection port is provided with a valve mechanism (8a) which increases and decreases an amount of opening of the ejection port (7), the valve mechanism (8a) comprises a rotating shaft (28a) rotatably supported with respect to the ejection port (7), a damper (29a) fixed to the rotating shaft (28a) that opens and closes the ejection port (7), a cylinder (32) having a rod (33), and a lever (43) that links the rod (33) and the rotating shaft (28a), converts reciprocating motion of the rod (33) to rotational motion of the rotating shaft (28a), and transmits this motion, and an inflow pressure of the raw fluid from the supply path (50) into the filter chamber (3) and rotation of the vanes (15, 15) causes the filtered fluid to flow out from the filter element (4) to the outside of the filter chamber (3), a cake that remains inside the filter chamber (3) being pushed to the outside of the filter chamber (3) via the ejection port (7).

41. A continuous compression-type dewatering apparatus according to claim 40, wherein the side plates (1, 1) are disposed so as to be substantially mutually parallel, with a distance (D) from an end edge (15b) of one vane (15) to an adjacent vane (15) to the rear thereof with respect to the direction of rotation established as being greater than a length (L) between the side plates (1, 1).

42. A continuous compression-type dewatering apparatus comprising:

a plurality of filter units (70) provided in parallel; and a drive shaft (17), wherein each filter unit (70) comprises a filter chamber delineated by an annular plate (2) and two side plates (1, 1) and a vane (115) disposed within the filter chamber (3), the annular plates (2, 2) are disposed around a common center axis and the drive shaft (17) passes through the center axis of the annular plates (2, 2) and through the inside of the filter chambers (3), and is free to rotate with respect to the filter chambers (3), the vane (15) is fixed with respect to the drive shaft (17), extends in a radial direction towards the annular plate (2), and rotates in concert with the drive shaft (17), a supply path (50) supplying raw fluid to each filter chamber (3) is formed inside the drive shaft (17), the vane (15) has two side edges (15a) facing the side plates (1, 1), and an end edge (15b) facing the annular plate (2), at least one of the side plates (1, 1) of each filter unit (70) includes a filter element (4) for separating the raw fluid into a filtered fluid and a cake, the annular plate (2) includes an ejection port (7) for the cake, the ejection port is provided with a valve mechanism (8a) which increases and decreases an amount of opening of the ejection port (7), the valve mechanism (8a) comprises a rotating shaft (28a) rotatably supported with respect to the ejection port (7), a damper (29a) fixed to the rotating shaft (28a) that opens and closes the ejection port (7), a cylinder (32) having a rod (33), and a lever (43) that links the rod (33) and the rotating shaft (28a), converts reciprocating motion of the rod (33) to rotational motion of the rotating shaft (28a), and transmits this motion, and an inflow pressure of the raw fluid from the supply path (50) into the filter chamber (3) and rotation of the vane (15) causes the filtered fluid to flow out from the filter element (4) to the outside of the filter chamber (3), a cake that remains inside the filter chamber (3) being pushed to the outside of the filter chamber (3) via the ejection port (7).

* * * * *